United States Patent
Ross

(10) Patent No.: US 9,035,606 B2
(45) Date of Patent: May 19, 2015

(54) ATM AND ELECTRIC VEHICLE CHARGING STATION

(75) Inventor: Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 673 days.

(21) Appl. No.: 13/087,932

(22) Filed: Apr. 15, 2011

(65) Prior Publication Data

US 2012/0262112 A1    Oct. 18, 2012

(51) Int. Cl.
- *H02J 7/00* (2006.01)
- *B60L 11/18* (2006.01)
- *G07F 15/00* (2006.01)
- *G07F 19/00* (2006.01)

(52) U.S. Cl.
CPC ........... *H02J 7/0042* (2013.01); *B60L 11/1844* (2013.01); *B60L 11/1838* (2013.01); *G07F 19/205* (2013.01); *G07F 19/00* (2013.01); *B60L 11/1846* (2013.01); *B60L 11/1848* (2013.01); *G07F 19/211* (2013.01); *G07F 19/206* (2013.01); *B60L 11/1818* (2013.01); *B60L 11/1824* (2013.01); *G07F 19/20* (2013.01); *G07F 15/005* (2013.01); *Y02T 10/7005* (2013.01); *Y02T 90/121* (2013.01); *Y02T 90/14* (2013.01); *Y02T 90/128* (2013.01)

(58) Field of Classification Search
CPC ........... B60L 11/1824; B60L 11/1838; B60L 11/1844; B60L 11/1846; B60L 11/1848; G07F 19/00; G07F 19/20; G07F 19/205; G07F 19/206; G07F 19/211
USPC ......................................... 320/109; 902/8–21
See application file for complete search history.

(56) References Cited

U.S. PATENT DOCUMENTS

| | | | | |
|---|---|---|---|---|
| 6,081,205 | A * | 6/2000 | Williams | 340/932.2 |
| 6,789,733 | B2 * | 9/2004 | Terranova et al. | 235/381 |
| 7,143,065 | B1 * | 11/2006 | Enright | 705/43 |
| 8,350,525 | B2 * | 1/2013 | Handler | 320/109 |
| 2004/0153377 | A1 * | 8/2004 | Dallman | 705/27 |
| 2007/0016795 | A1 * | 1/2007 | Asano | 713/182 |
| 2009/0108015 | A1 * | 4/2009 | Kreamer | 221/8 |
| 2010/0161469 | A1 * | 6/2010 | Littrell | 705/35 |
| 2010/0161481 | A1 * | 6/2010 | Littrell | 705/40 |
| 2010/0161482 | A1 * | 6/2010 | Littrell | 705/40 |
| 2011/0140656 | A1 * | 6/2011 | Starr et al. | 320/109 |
| 2011/0186627 | A1 * | 8/2011 | Kreamer | 235/379 |
| 2011/0204847 | A1 * | 8/2011 | Turner | 320/109 |
| 2011/0227531 | A1 * | 9/2011 | Rajakaruna | 320/109 |
| 2012/0047036 | A1 * | 2/2012 | Allan | 705/21 |
| 2012/0136785 | A1 * | 5/2012 | Kreamer | 705/41 |

* cited by examiner

*Primary Examiner* — Yalkew Fantu
*Assistant Examiner* — Manuel Hernandez
(74) *Attorney, Agent, or Firm* — Michael A. Springs; Moore & Van Allen PLLC; Nicholas C. Russell

(57) ABSTRACT

Embodiments of the invention are directed to a system or method for an electric station. Embodiments of the invention provide an electric station which allow a customer to charge an electric vehicle, to access a Wi-Fi hot-spot, receive location based promotions, and allows access to the customer's financial data via an ATM. The combination of an ATM and electric car charger provides additional identification means, payment means, and convenience for a customer of either the ATM or the electric vehicle charger.

41 Claims, 9 Drawing Sheets

ATM AND ELECTRIC VEHICLE CHARGING STATION

BACKGROUND

Customers typically have a number of ways to pay for fuel at a gas station. These payment methods may include pay-at-the-pump methods such as credit or debit cards, or pay-inside methods such as payment with cash. Even with the multitude of payment methods, payment for fuel has become increasingly difficult. This is largely due to drastic increases in fuel prices over the last several years.

With limited oil reserves and gradually increasing fuel prices, developments in alternative fuel sources have risen within the last several decades. One of the alternative fuel sources, at least with respect to the automotive industry, is electricity. Functional electric vehicles have been developed and are now being sold by many of the major automobile manufacturers.

The accessibility to electricity provides several charging options for the electric vehicle owner. One such option is an electric vehicle charger adapted for installation in a home. This option proves to be very convenient for several reasons. First, a person can charge his vehicle in a convenient place, such as his garage. Second, because a typical electric car takes longer to charge in comparison to filling a gasoline powered car with gasoline, the vehicle owner may allow for the longer charging times, while at home.

However, there may be a time when charging is needed and the home electric charger is not available. In response, several electric vehicle charging stations have been placed in convenient locations that allow electric vehicles to be charged for an extended period of time.

BRIEF SUMMARY

Embodiments of the present invention address the above needs and/or achieve other advantages by providing apparatuses (e.g., a system and/or other devices) and methods for providing an automated teller machine ("ATM") and an electric vehicle charger coupled to each other. The combination of an ATM machine and an electric vehicle charger allows for customer authentication and payment methods to be implemented by either the ATM machine or the electric vehicle charger. The combination also allows for a customer to use ATM machine functionality while his vehicle is being charged.

Embodiments of the invention allow for an electric station, which provides a combination electric vehicle charger and ATM machine. The combination allows for customer identification by either the ATM functionality or the electric vehicle charger functionality. Further, the combination allows for payment for use of the station through any financial means available from the ATM functionality and several other means of providing payment, such as the use of a credit card.

Embodiments of the invention relate to systems and methods for providing an electric station for use by a customer comprising: coupling an automated teller machine and an electric vehicle charger, such that the automated teller machine and the electric vehicle charger are communicably linked; receiving a request to use the electric station from the customer; authenticating the identification of the customer; providing automated teller machine functionality based at least in part on the authentication, to the customer, using a processing device; and allowing the customer access to the electric vehicle charger configured to charge a vehicle. Providing the automated teller machine functionality comprises providing access to one or more financial accounts to the customer. In some embodiments, a payment for use of the electric station is based at least in part on the automated teller machine functionality.

Embodiments of the invention further relate to systems and methods for providing an electric station for use by a customer comprising: providing a communication link with an account provider; providing an electric vehicle charger, configured to charge a vehicle; coupling the communication link and the electric vehicle charger, such that the automated teller machine and the electric vehicle charger cooperate to identify and authorized use of the electric station; receiving a request to use the electric station from an account holder; authenticating, using a processing device, identification of the account holder; and providing automated teller machine functionality based at least in part on the authentication, to the customer, using a processing device.

In some embodiments, coupling the automated teller machine and the electric vehicle charger comprises creating a physical coupling between the automated teller machine and the electric vehicle charger. Coupling the automated teller machine and the electric vehicle charger further comprises establishing an electronic communication channel between the automated teller machine and the electric vehicle charger.

In some embodiments, authenticating identification of the customer is based at least in part on an identifier provided by a customer, wherein the identifier is further enabled to allow access to the electric station. In some embodiments, the identifier is provided to the electric station via a contact terminal. In another embodiment, the identifier is provided to the electric station via a signal from a contactless terminal. In yet another embodiment, the identifier is provided to the electric station through a connection between an electric vehicle charger and a vehicle, wherein the identifier is provided by the vehicle. In some embodiments, the identifier may be a password, pass code, pin number, magnetic strip reader, etc.

In some embodiments, allowing access to the electric vehicle charger comprises providing an outlet adapted to charge the vehicle. Allowing access to the electric vehicle charger further comprises a cable adapted to be removably attached to the electric vehicle and is configured to charge the vehicle.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
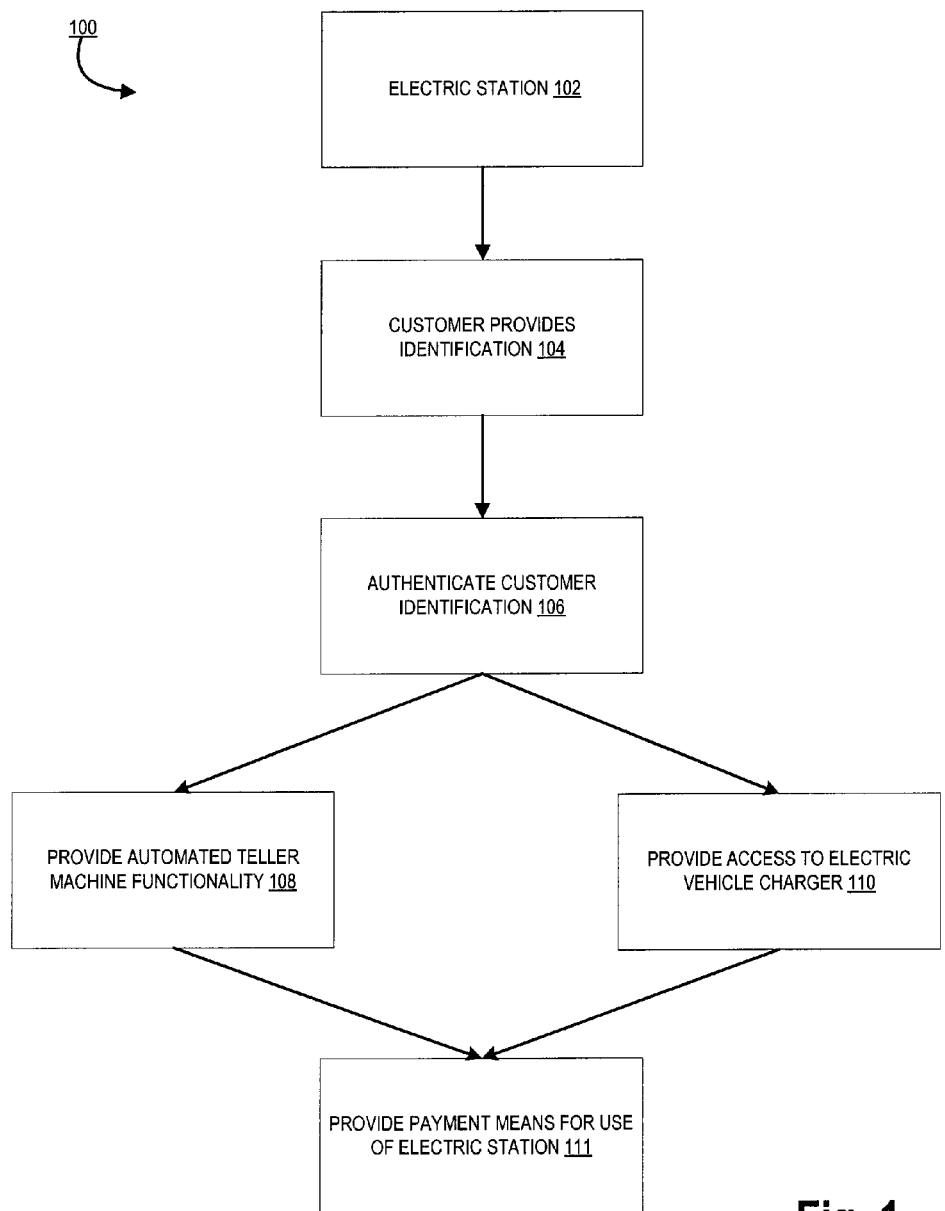
Figure 2:
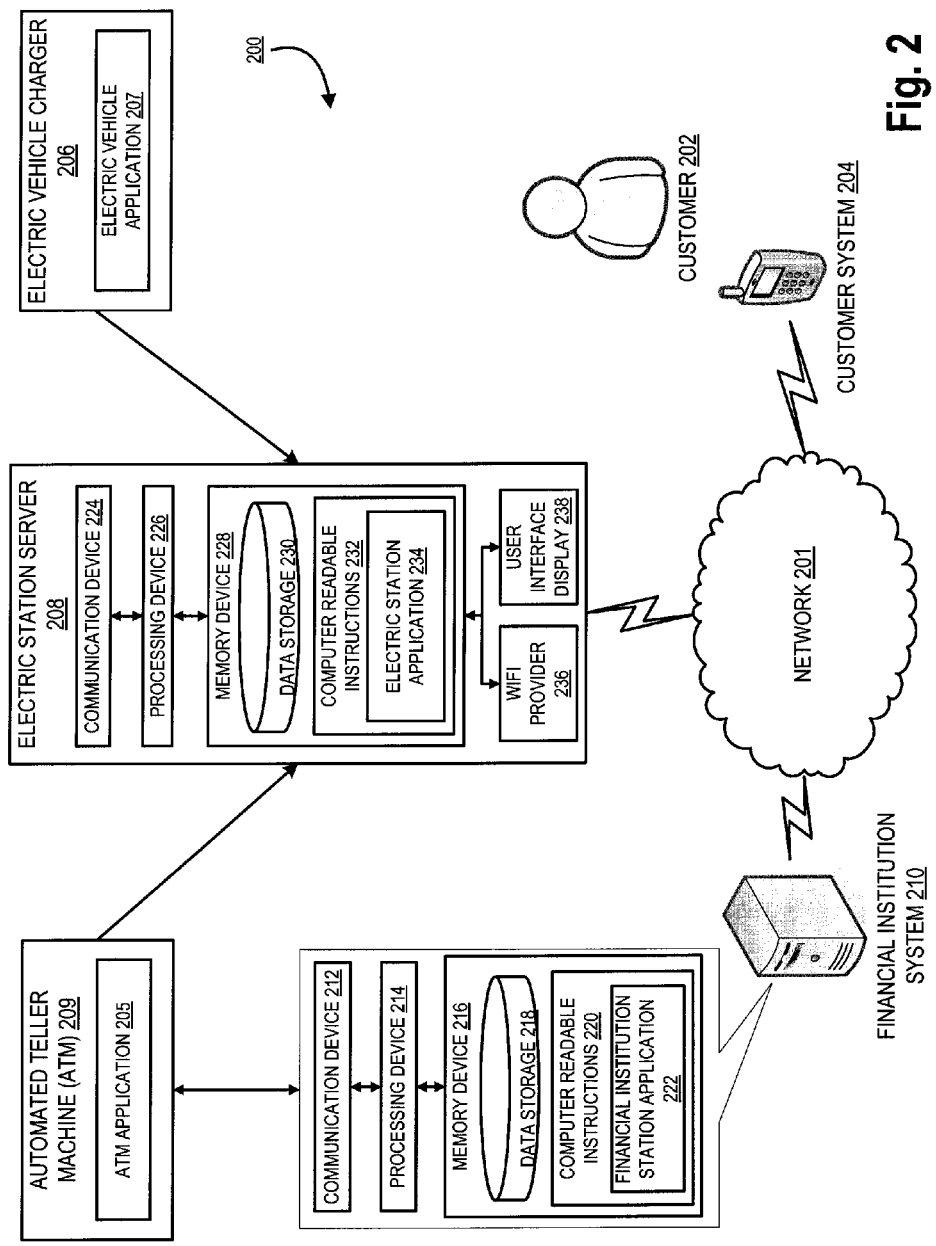
Figure 3:
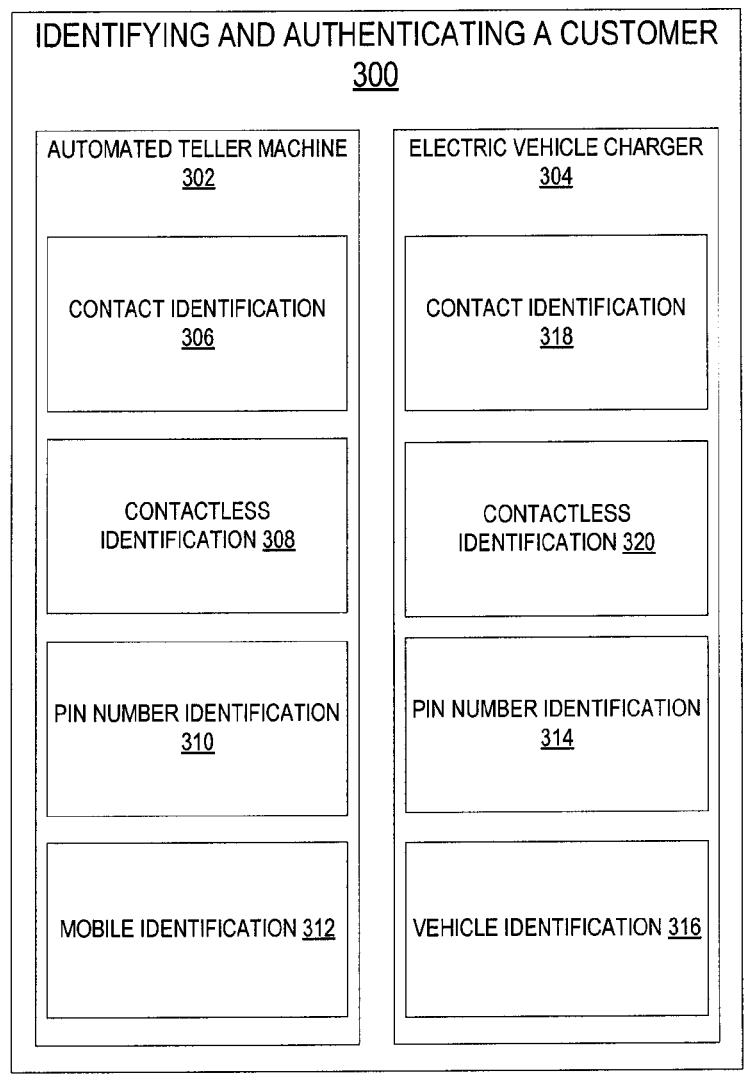
Figure 4:
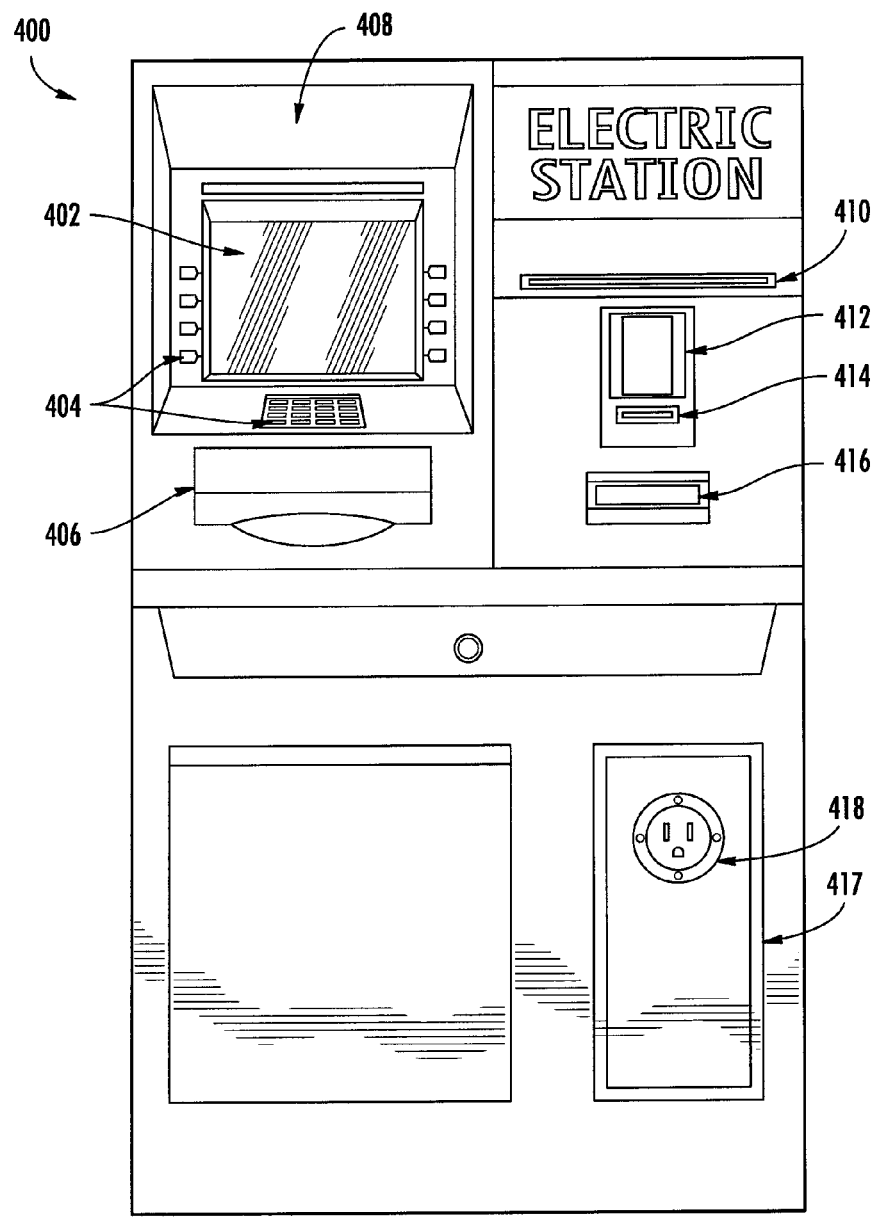
Figure 5:
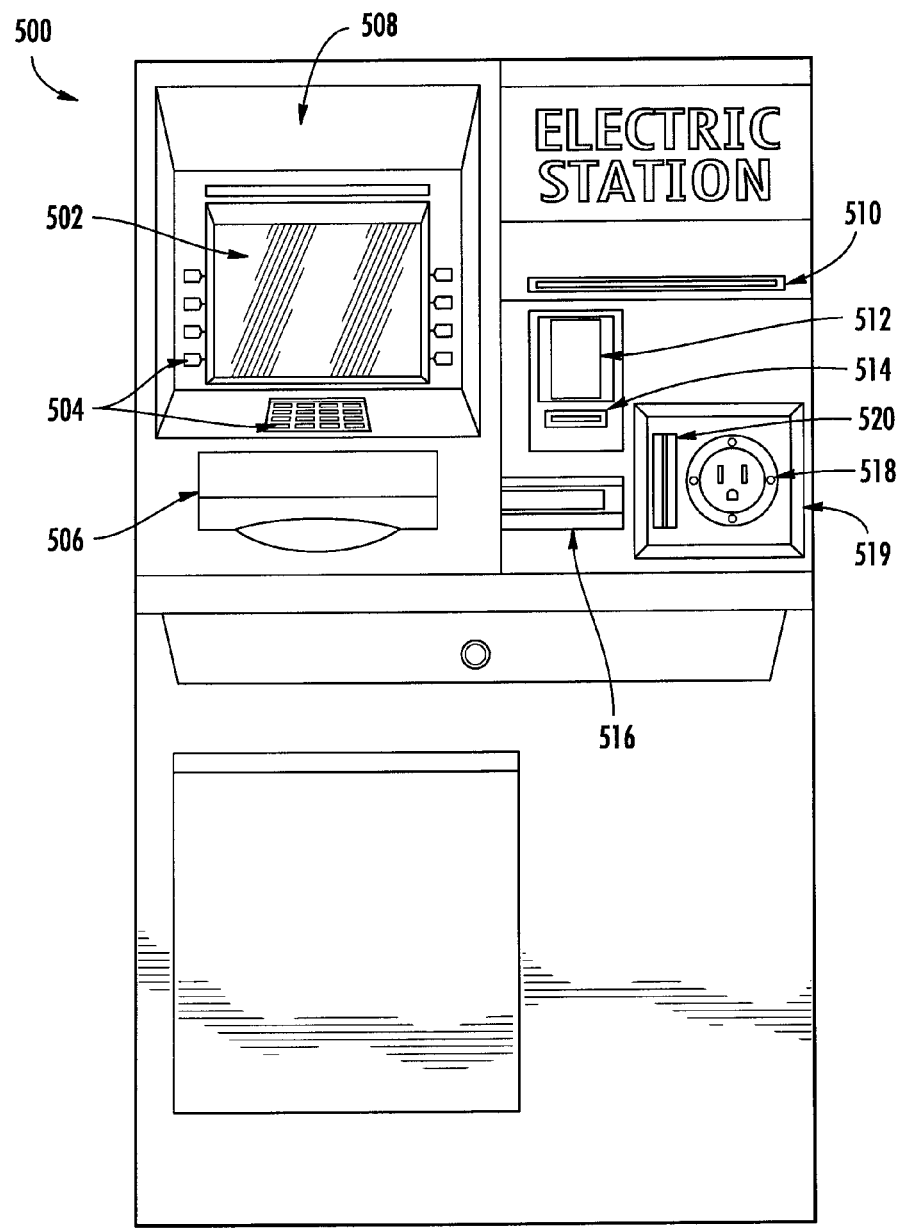
Figure 6:
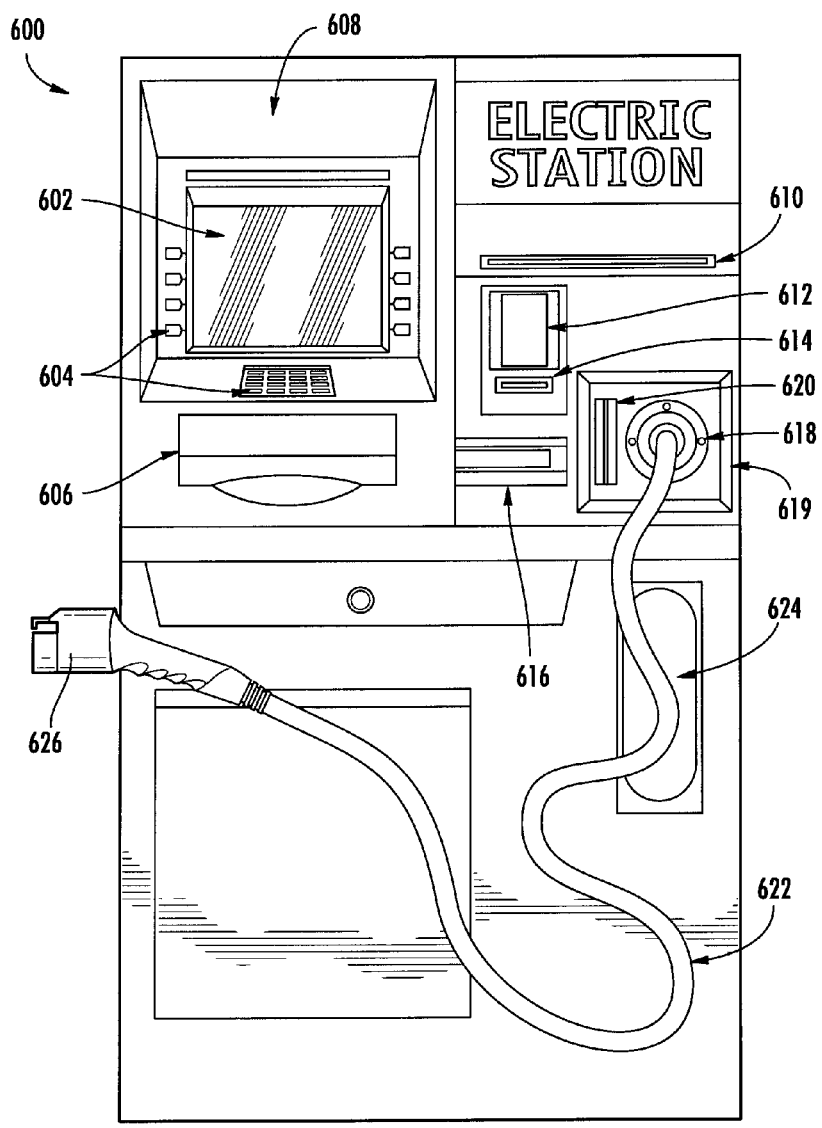
Figure 7:
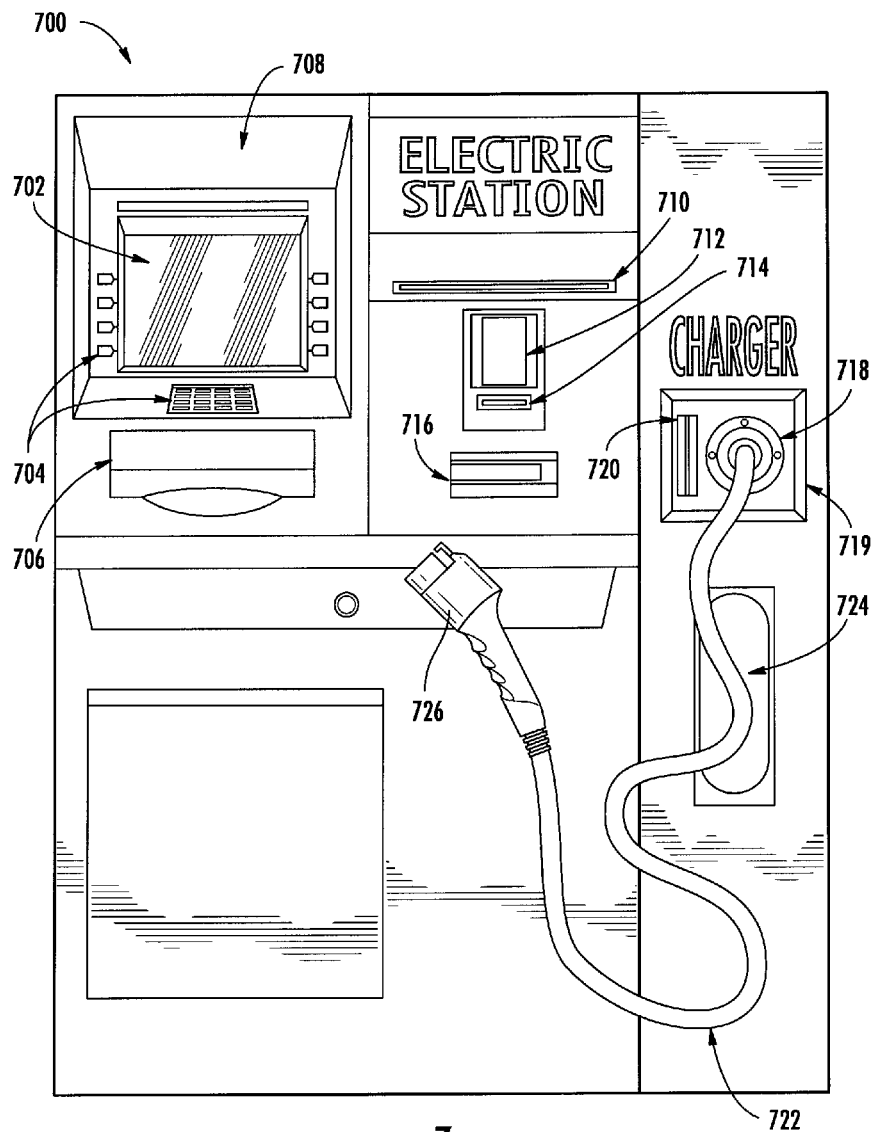
Figure 8:
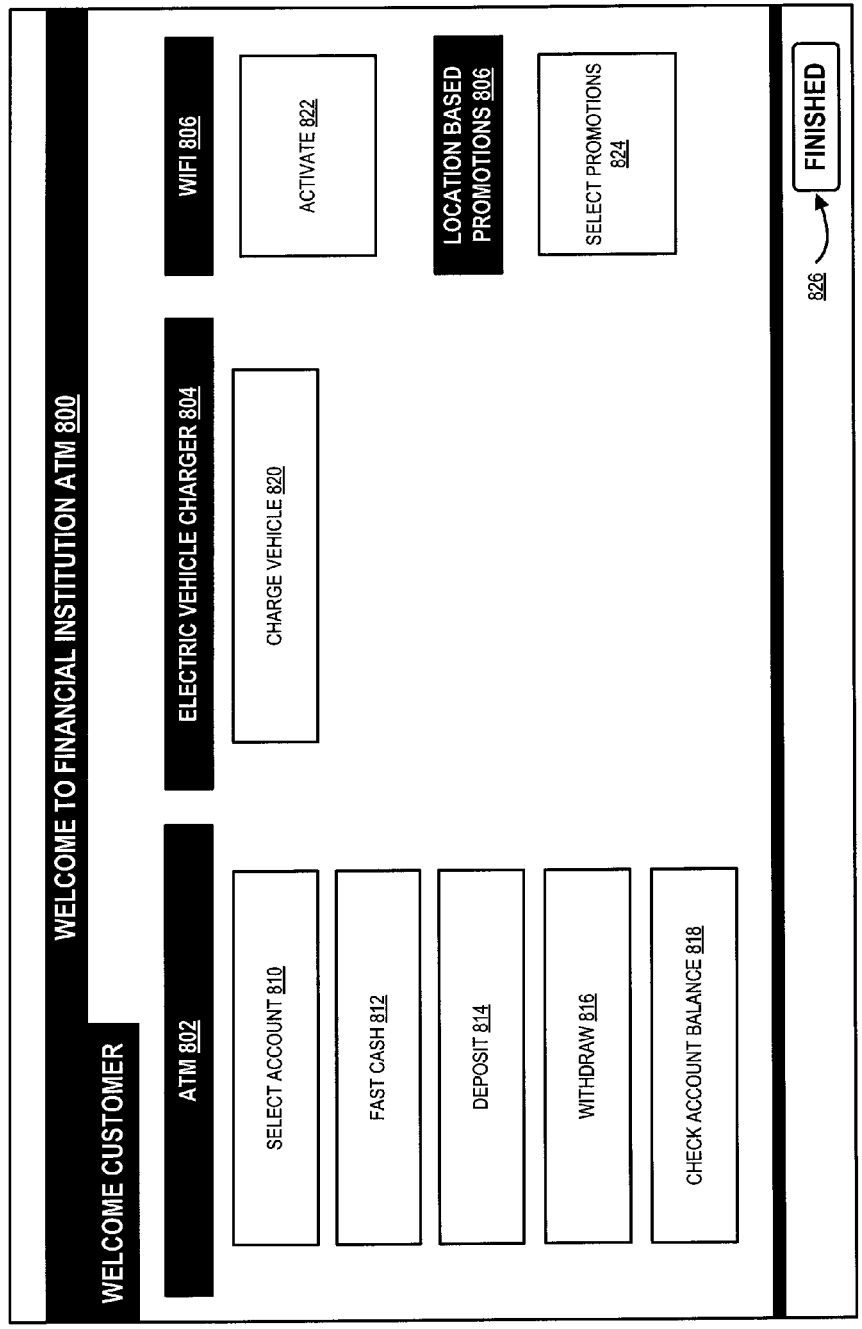
Figure 9:
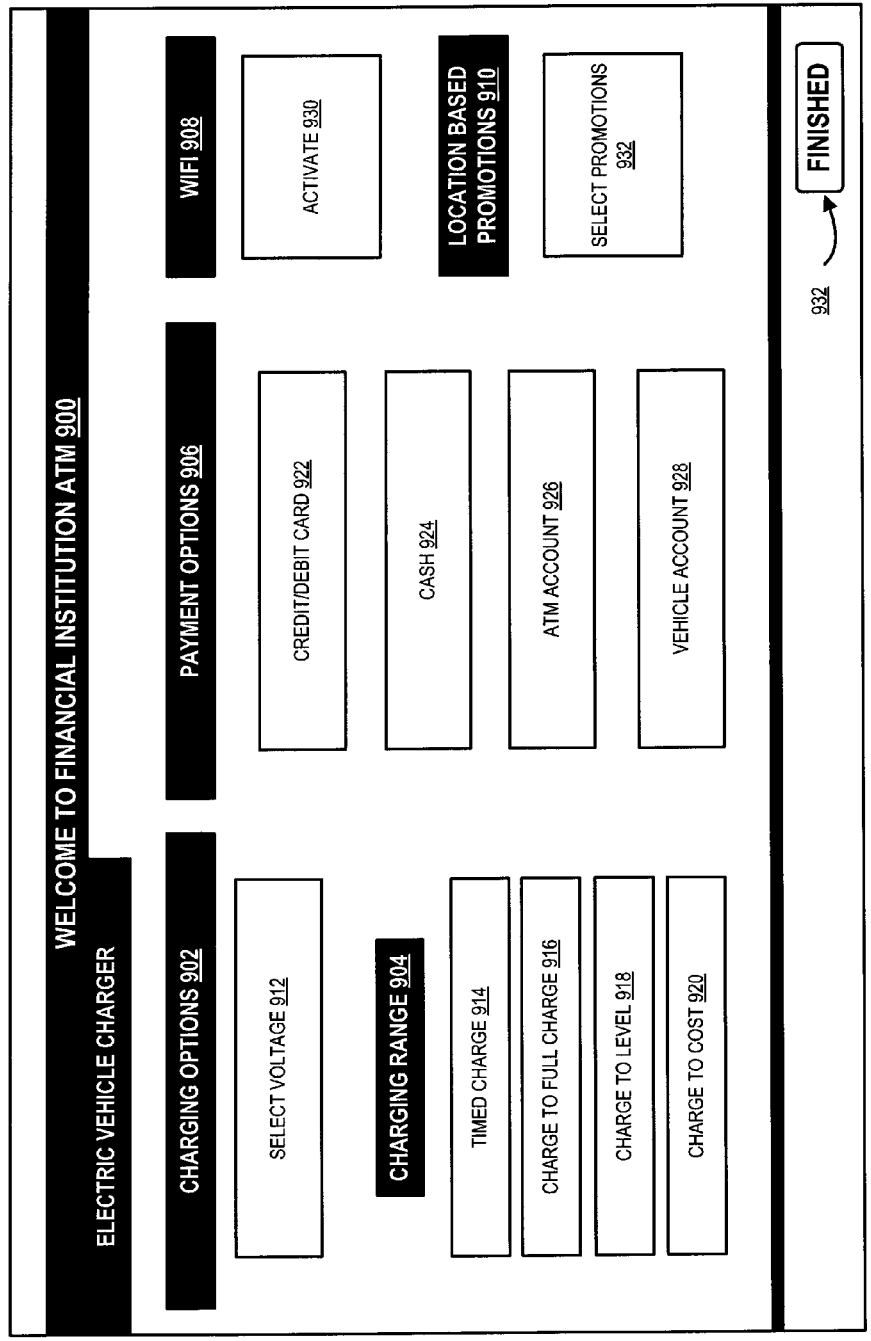

Having thus described embodiments of the invention in general terms, reference will now be made to the accompanying drawings, wherein:

FIG. 1 provides a high level process flow illustrating providing an electric station, in accordance with one embodiment of the present invention;

FIG. 2 provides an electric station system environment, in accordance with one embodiment of the present invention;

FIG. 3 provides a process map illustrating identification and authentication means available to the electric station, in accordance with one embodiment of the present invention;

FIG. 4 provides one embodiment of the electric station, in accordance with one embodiment of the present invention;

FIG. 5 provides another embodiment of the electric station, in accordance with one embodiment of the present invention;

FIG. 6 provides another embodiment of the electric station, in accordance with one embodiment of the present invention;

FIG. 7 provides another embodiment of the electric station, in accordance with one embodiment of the present invention;

FIG. 8 provides a start-up interface, in accordance with one embodiment of the present invention; and FIG. 9 provides a charging interface, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer ATM type machines.

This disclosure is written in terms of an ATM machine coupled with an electric vehicle charger. It is understood that the ATM machine and the electric vehicle charger may be provided by the same business entity or by multiple business entities in a commercial partnership with each other. For example, the ATM may be associated with a financial institution and an electric vehicle charger maybe provided by a business partner of the financial institution that is in the business of providing electric vehicle chargers. In another example, the ATM and the electric vehicle charger may be both provided by the same business entity.

FIG. 1 illustrates a high level process flow for providing an electric station 100, which will be discussed in further detail throughout this specification with respect to FIGS. 2 through 9. The first step is providing an electric station 102 to a customer. In some embodiments, the electric station may be an ATM physically coupled to an electric vehicle charger, such as illustrated in the electric station. The electric station, in this embodiment, may provide an ATM and an electric vehicle charger within the same physical structure. In some embodiments, the electric station may be an ATM communicably coupled to an electric vehicle charger. The electric station, in this embodiment, may provide an ATM located remotely from the electric vehicle charger. In this way, an electric vehicle charger may communicate with an ATM or customer bank account to enable payment for use of the electric station.

Once a customer accesses an electric station in block 102, prior to use of the electric station, the customer may provide identification in block 104. In some embodiments, identification of a customer may be provided via the ATM. For example, the customer may provide a magnetically coded ATM card in combination with a pin number or other identification, to gain access to the ATM. This customer identification may be used for identification for use of all aspects of the electric station, including the ATM functionality and/or the electric car charger functionality. In some embodiments, identification of the customer may be provided via the electric vehicle charger. For example, the customer may provide a credit card for payment for electricity to charge a vehicle. This customer identification may be used for identification for use of all aspects of the electric station, including the electric vehicle charger functionality and/or the ATM functionality. In another example, the vehicle may provide identification to the electric station. In this example, the electric vehicle may provide identification, such as a vehicle identification number ("VIN number") or other identification to the electric vehicle charger. This may be achieved by a coding within the charging mechanisms of the vehicle or by a signal or other form of identification provided from the electronic system of the vehicle to the electric station.

The vehicle provided identification may also allow the electric station a method of theft protection. The electric station may identify both the customer and the vehicle. The customer may be identified through the ATM functionality of the electric station or the use of a credit card for payment for use of the electric station. A vehicle may be identified by its provided identification, such as a VIN number. The electric station may determine if a match between the customer using the ATM functionality and the customer the vehicle identifies as an owner. If there is no match between the customer and the vehicle owner, the electric station may provide means of notifying the proper authorities of a possible stolen electric vehicle. For example, if a customer charges an electric vehicle and provides a credit card for payment for use of the electric station, the electric station may identify the electric vehicle as registered to a customer different than that of the credit card. The electric station may notify the authorities and keep the vehicle in a charging mode until the proper authorities are able to determine if the electric vehicle is stolen.

Next, the customer identification provided in block 104, is authenticated in block 106. The customer provided identification and the authentication of the identification will be discussed in further detail below with respect to FIG. 3. The authentication of customer identification 106 is provided via the system of the electric station in communication with a financial institution system. The method of authentication is dependent on the form of identification used by the customer. For example, if the customer uses the ATM pin for identification, the method for authentication will be directed through his ATM provider. The ATM provider, or the financial institution, will authenticate the identification of the user. The authentication of customer identification 106 allows a customer to use all of the electric station functions including the ATM and/or the electric vehicle charger.

The electric station functions are illustrated in block 108 and block 110. In block 108 the electric station provides ATM functionality. In block 110 the electric station provides electric vehicle charger functionality. Once the customer has used the ATM functionality 108 and/or the electric vehicle charger functionality 110, the electric station may allow the customer a means to for payment for use of the electric station, in block 111. Whether the payment is for the ATM functionality 108, the electric vehicle charger 110, or both the ATM functionality 108 and the electric vehicle charger 110, the electric station provides an ability to pay for either or both functionalities in block 111. In some embodiments, payment means may be provided through the use of the ATM functionality. ATM functionality may include customer access to customer financial accounts, adjust ATM accounts, change investments, etc. Thereby providing the customer accounts for payment means for the electric station. These accounts may be, but are not limited to savings accounts, checking accounts, investment accounts, etc. All accounts that are accessible via the ATM functionality may be available for use as payment for the electric station. For example, if the customer wishes to pay for use of the electric station by use of a savings account the customer has associated with the financial institution providing the ATM. Accounts associated with financial institutions other than the financial institution provided ATM may also be used as payment device for the electric station.

In another embodiment, the electric vehicle charger functionality may provide payment means for a customer use of the electric station. For example, the customer may also have an account associated with the electricity provider and may direct the payment for charging his vehicle to that account. Further, there may be an account associated with the electric vehicle, for example, through the vehicle's VIN number or through the vehicle manufacturer system, such as OnStar. The payment means provided by either the ATM functionality or the electric vehicle charger functionality may be applied for payment of any use of the electric station. For example, if the customer uses the electric station only to charge his vehicle, he only used the electric vehicle charger functionality, not the ATM functionality. However, the customer may be able to provide payment for the electric vehicle charger functionality he used, with the ATM payment means.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides an electric station system environment 200, in accordance with one embodiment of the present invention. As illustrated in FIG. 2, a financial institution system 210 is operatively coupled, via a network 201 to the customer system 204, to the electric station server 208 and to the ATM 209. In this way, the financial institution system 210 can send information to and receive information from the customer system 204, the electric station server 208 and the ATM 209. The electric station server 208 is also communicably coupled to both an ATM 209 and an electric vehicle charger 206. In this way, the electric station server 208 is able to communicate to the ATM 209 and the electric vehicle charger 206 without using the network 201. FIG. 2 illustrates only one example of an embodiment of an electric station system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a land phone line, or any other type of network or combination of networks. The network 201 may provide for wireline, wireless, or a combination wireline and wireless communication between devices on the network.

In some embodiments, the customer 202 is an individual using an electric station. The customer 202 may use the electric station for charging a vehicle, for using an ATM 209, or a combination thereof. In some embodiments, the customer 202 may use the electric station to provide an electric charge to a vehicle. The electric vehicle charger 206 of the electric station may provide the customer 202 with electric vehicle charging capabilities. In some embodiments, the customer 202 may use the electric station to use an ATM 209. The ATM 209 may provide for financial account management, financial transactions, and other functions. Both the ATM 209, through traditional ATM functionality, and the electric vehicle charger 206 may provide the customer 202 with financial transaction capabilities.

A customer 202 may use the electric station through a customer system 204. In some embodiments, a customer system 204 may be a system such as a mobile wallet (i.e. smart phone, PDA, etc.) or other types of payment systems that communicate with the electric station server 208 and/or financial institution system 210 to allow the customer 202 to use the electric station. The customer system 204 may also be a customer 202 vehicle. The customer 202 vehicle may provide a customer system 204 that communicates with the electric station server 208 and/or the financial institution system 210 for use of the electric station. In some embodiments, the vehicle may not be a system able to communicate with the electric station server 208 or the financial institution system 210. However, in this case, the vehicle may still be connected to the electric station server 208 through the electric vehicle charger 206. Whether the vehicle provides a customer system 204 or not, the electric station server 208 may be in communication with the vehicle and provide the vehicle with adequate charging. The vehicle may provide the electric station server 208 with charging capacities, batter indications, and other vehicle system diagnostics. In some embodiments of the invention, the customer 202 may use the electric station by using a card with stored magnetic information, digital information, or other like payment device that stores information that may be transferred to the electric station server 208 and/or a financial institution server 210 to allow a customer 202 to use the electric station or enter into a transaction at the electric station. In some embodiments, a customer system 204 may not be required in for the system 200 to operate.

As illustrated in FIG. 2, the financial institution system 210 generally comprises a communication device 212, a processing device 214, and a memory device 216. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 214 is operatively coupled to the communication device 212 and the memory device 216. The processing device 214 uses the communication device 212 to communicate with the network 201 and other devices on the network 201, such as, but not limited to the electric station server 208 and the customer system 204. As such, the communication device 212 generally comprises a modem, server, or other device for communicating with other devices on the network 201.

As further illustrated in FIG. 2, the financial institution system 210 comprises computer-readable instructions 220 stored in the memory device 216, which in some embodiments includes the computer-readable instructions 220 of a financial institution station application 222. In some embodiments, the memory device 216 includes data storage 218 for storing data related to the electric station and financial institution accounts. The data storage 218 may also include data created and/or used by the financial institution station application 222.

In the embodiment illustrated in FIG. 2 the financial institution station application 222 allows for access to and data from the financial institution accounts of a customer 202 located on the financial institution system 210. In some embodiments, the accounts may be accounts associated with the customer 202 that the customer 202 may have access to through the ATM 209. In some embodiments, the accounts may be accounts the customer 202 has with other financial institutions. The access to and data from the accounts located on the financial institution system 210 may provide for customer 202 identification and authentication for use of the electric station, general ATM functionality of the electric station, and payment for use of the electric station.

In some embodiments, as explained in further detail below, the financial institution station application 222 allows the customer 202 to identify himself and for subsequent authentication of his identification. The identification may be provided by several mechanisms, including, but are not limited to, biometric identification, laser identification, magnetic strip readers, barcodes, radio frequency (RF), a character recognition device, code readers, near field communication, and/or the like. In one example, the customer 202 may provide identification through the use of the ATM 209. This identification may be in the form of an ATM card and corresponding pin number. The electric station server 208 communicates to the financial institution station application 222 a request of identification of a possible electric station customer 202. The request for identification includes the ATM card code and corresponding pin number the customer 202 inputted. The data stored within the financial institution station application 222 provides computer readable instructions 220 to the processing device 214 to allow authentication of the customer 202 if the ATM card code and corresponding pin number correlate to a matching customer 202. In some embodiments, the electric station application 234 provides authentication of the identification without communicating with the financial institution system 210.

In another example, the customer 202 may provide identification through the use of the electric vehicle charger 206. This identification may be in the form of a vehicle specific identification or code. The electric station server 208 communicates to the financial institution station application 222 a request for identification of a possible electric station customer 202. The request for identification include may include the vehicle specific code. The data stored within the financial institution station application 222 provides computer readable instructions 220 to the processing device 214 to allow authentication of the customer 202 if the vehicle specific code correlates to a matching customer 202. In some embodiments, the electric station application 234 provides authentication of the identification without communicating with the financial institution system 210.

The vehicle provided identification may also allow the electric station a method of theft protection. The electric station may determine if a match between the customer using the ATM functionality and the customer the vehicle identifies as an owner. If there is no match between the customer and the vehicle owner, the electric station may provide means of notifying the proper authorities of a possible stolen electric vehicle. For example, if a customer charges an electric vehicle and provides a credit card for payment for use of the electric station, the electric station may identify the electric vehicle as registered to a customer different than that of the credit card. The electric station may notify the authorities and keep the vehicle in a charging mode until the proper authorities are able to determine if the electric vehicle is stolen.

In some embodiments, as explained in further detail below, the financial institution station application 222 may receive a request to provide the customer 202 with general ATM functionality from the electric station. The financial institution station application 222 may provide the electric station server 208 a user interface on the user interface display 238 through the communication device 212. The user interface and data associated with the general ATM functionality is then communicated from the electric station server 208 to the ATM application 205. The user interface, as described in more detail below, provides the customer 202 with general ATM functionality at the electric station once identification of the customer 202 has been authenticated. The financial institution station application 222 provides the electric station server 208 general ATM functionality associated with the identified customer 202. For example, the ATM functionality may be access to the identified customer accounts, customer financial transactions including deposits, withdraws, and cash advances, and other ATM functions such as providing stamps, loading virtual currency, etc.

In some embodiments, as explained in further detail below, the financial institution station application 222 may receive payment requests from the electric station server 208. The payment requests may be received by the financial institution station application 222 from the electric station application 234, through a network 201. The payment requests may be for customer's use of the functionality available at the electric station. The payment request may be for use of the electric vehicle charger 206. The payment request may be for use of the ATM 209. The payment request may be for use of both the electric vehicle charger 206 and the ATM 209.

The payment requests may correspond to payment accounts associated with the customer 202 through the financial institution of the ATM 209, including accounts associated with the financial institution of the ATM 209 may include, but are not limited to payment from an account associated with the financial institution of the ATM 209, payment of cash, payment from an account associated with other financial institutions, virtual currency, etc. For example, the customer 202 may wish to pay for his use of the electric station with cash. However, he may not have any cash with him at the time. Because the electric station has an ATM 209 communicably linked to the electric station server 208, the customer 202 may be able to apply cash from an account associated with the ATM 209 and direct that cash for his payment for use of the electric station. In some embodiments, the payment requests correspond to payment accounts associated with the customer 202 vehicle through the electric vehicle charger 206. The vehicle specific identification or code, described above, may not only provide for identification of a customer 202 and authentication of that identification, it may also be associated with a customer account. The customer account associated with the vehicle specific code may provide for payment for the customer 202 use of the electric station. In this way, the electric station server 208 communicates the account information to the financial institution station application 222 and the financial institution station application 222 communicates with the processing device 214 to process the transaction to the vehicle specific account. In another embodiment, the payment requests correspond to payment accounts associated with other financial institutions or business entities. The payment requests are then processed to the appropriate customer 202 account at the financial institution or distributed to the requisite billing entity by the processing device 214.

As illustrated in FIG. 2, the electric station server 208 generally comprises a communication device 224, a processing device 226, and a memory device 228. The processing device 226 is operatively coupled to the communication device 224 and the memory device 228. The processing device 226 uses the communication device 224 to communicate with the network 201 and other devices on the network 201, such as, but not limited to the financial institution system 210 and the customer system 204. As such, the communication device 224 generally comprises a modem, server, or other device for communicating with other devices on the network 201.

As illustrated in FIG. 2, the electric station server 208 comprises computer-readable instructions 232 stored in the memory device 228, which in some embodiments includes computer-readable instructions 232 for an electric station application 234. In some embodiments, the memory device 228 includes data storage 230 for storing data related to the electric station including, but not limited to the ATM 209, the electric vehicle charger 206, and the data created and/or used by the electric station application 234.

In the embodiment illustrated in FIG. 2, and described throughout this application, the electric station application 234 allows for a link between the ATM 209 and the electric vehicle charger 206. In this way, the electric station application 234 comprises data received from the ATM 209, from the electric vehicle charger 206, and account information from the financial institution system 210.

In some embodiments, prior to the customer 202 using the electric station, the electric station application 234 may notify customer systems 204, including electric vehicle customer systems, within a vicinity of the electric station the location of the electric station. In this way, the customers 202 with electric vehicles may be notified of the location of an electric station. The vehicle may notify the customer 202 of a near by electric station and the need for the vehicle to be charged. The electric station application 234 may provide the customer system 204 the indication of its location through the use of a network 201.

In some embodiments, the data received by the electric station application 234 provides customer 202 identification and authentication. The customer 202 may use the ATM 209 to provide identification. The electric station application 234 receives the provided identification from the ATM application 205 and authenticates the identification with the financial institution system 210. For example, the customer 202 may provide an ATM card and associated pin number for identification and access to the electric station. The electric station application 234 receives the provided code from the ATM card and the associated pin number and authenticates the code and pin number with the financial institution system 210. The customer 202 may use the electric vehicle charger 206 to provide identification. The electric station application 234 receives the provided identification from the electric vehicle application 207 and authenticates the identification with the financial institution system 210. For example, the customer 202 vehicle may provide a vehicle specific identification or code that may be linked to a payment account. The identification or code may be read by the electric vehicle application 207. The electric station application 234 receives the provided code from the electric vehicle application 207 and authenticates the code with the financial institution system 210. In some embodiments, the identification and authentication may be provided by means other than through the ATM 209 or the electric vehicle charger 206. For example, the customer 202 may use a credit card with magnetic strip code at the electric station. The electric station application 234 receives the provided identification and authenticates the identification with the financial institution system 210. In some embodiments, the customer 202 may provide a partial form of identification to both the ATM 209 and the electric vehicle charger 206. The electric station application 234 receives the identification from the ATM application 205 and the electric vehicle application 207, combines the identifications and authenticates the identification with the financial institution system 210. Once the identification has been received and the electric station application 234 and/or the financial institution system 210 has authenticated the identification, the electric station application 234 allows for customer 202 access to the electric station.

In some embodiments, the data received by the electric station application 234 provides customer 202 payment options for use of the electric station. The customer 202 may use the ATM 209 of the electric station. If fees are incurred during the use of the ATM 209 the electric station application 234 receives the fee data from the ATM application 205. The customer 202 may also use the electric vehicle charger 206 of the electric station. If fees are incurred during the use of the electric vehicle charger 206 the electric station application 234 receives the fee data from the electric vehicle application 207. Further, the customer 202 may use a combination of the ATM 209 and the electric vehicle charger 206 of the electric station. If fees are incurred during the use of the ATM 209 or the electric vehicle charger 206, the electric station application 234 receives the fee data from the ATM application 205 or the electric vehicle application 207, respectfully.

Once the fee data is received at the electric station application 234, the customer 202 may select payment means by the ATM functionality, the electric vehicle charger functionality, or other means. In some embodiments, the ATM functionality provides the customer 202 the ability to use any account associated with the financial institution linked to the ATM 209 for payment means for fees incurred by the customer 202 at the electric station. The ATM functionality also provides the customer 202 the ability to pay cash for any fees incurred by the customer 202 at the electric station. In some embodiments, the electric vehicle charger functionality provides the customer 202 the ability to use any accounts associated with the customer 202 vehicle for payment means of fees incurred by the customer 202 at the electric station. The accounts associated with the customer 202 vehicle may be vehicle specific identification or code, such as a VIN number, and may also be associated with a customer account 202. In this way, the customer 202 may provide payment for any fees incurred at the electric station. The electric vehicle application 207 reads the code associated with the customer 202 vehicle and provides the account information associated with that code to the electric station application 234. The customer 202 may pay for fees incurred at the electric station by other means including credit cards, debit cards not associated with the financial institution of the ATM 209, virtual currency, etc. The customer 202 may provide payment means for use of the electric station by a combination of the payment means available.

Once payments means are received by the electric station application 234. The electric station application 234 communicates the account information to the financial institution system 210 for processing of the payment. In some embodiments, the payment is processed at the financial institution system 210. In another embodiment, the payment is processed at another financial institution. In yet another embodiment, a partial payment is processed at both the financial institution system 210 and another financial institution.

In some embodiments, the data received by the electric station application 234 provides customer 202 display information. Display information is displayed by the electric station server 208 at the user interface display 238. The user interface display 238 receives display data from the electric station application 234. Display information allows a customer 202 to visualize data from the electric station. Display information may include data from the ATM 209. Data from the ATM 209 may include, but is not limited to data regarding instructions on using the ATM 209, ATM transactions, account data, etc. ATM transactions may include withdrawing of funds, depositing of funds, transferring of funds, amount of virtual currency, etc. Account data includes data associated with accounts of the financial institution of the ATM 209, including, but not limited to account balances, account interest rates, etc. The display information associated with the ATM 209 is communicated from the ATM application 205 to the electric station application 234 for display through the user display interface 238.

Display information may include data from the electric vehicle charger 206. Data from the electric vehicle charger 206 may include the charging status of the vehicle, whether charging has initiated with the vehicle, other vehicle system diagnostics, vehicle system updates, critical patches for the system, etc. Other vehicle system diagnostics may include, but are not limited to battery notifications, vehicle maintenance, scheduled vehicle maintenance, engine notifications, tire pressure notifications, system notification, etc. The display may also provide an alert to the user when the electric vehicle charger 206 has completed its charge, the remaining amount of charge, and/or the percent of charge remaining. The display information associated with the electric vehicle charger 206 is communicated from the electric vehicle application 207 to the electric station application 234 for display through the user display interface 238. Display information may include data from both the ATM 209 and the electric vehicle charger 206. The display information associated with the ATM 209 and the electric vehicle charger 206 is communicated from the ATM application 205 and the electric vehicle application 207 to the electric station application 234 for display through the user display interface 238.

The user interface display 238 provides a means for display information. Display information may be, but is not limited to display of interfaces, such as those depicted in FIGS. 8 and 9. Along with displaying these interfaces, the user interface display 238 may display data, instructions, and/or directions to the customer 202 regarding use the electric station. In some embodiments, the instructions and/or directions may be directed to a customer 202 using the ATM 209. For example, the display may provide the customer 202 instructions on how to use the ATM 209, the display may present data regarding ATM transactions, the display may indicate account data, etc. ATM transactions may include withdrawing of funds, depositing of funds, transferring of funds, etc. Account data may include data associated with accounts of the financial institution of the ATM 209, including, but not limited to account balances, account interest rates, etc. In some embodiments, the data, instructions, and/or directions may be directed to a customer 202 using the electric vehicle charger 206. For example, the display may provide the customer 202 instructions on how to use the electric vehicle charger 206, the display may notify the customer 202 when the vehicle has received adequate charging, the display may notify the customer 202 when the vehicle has received any charging, the display may notify the customer 202 of other vehicle system diagnostics, etc. Other vehicle system diagnostics may include, but not limited to battery notifications, generally vehicle maintenance, engine notifications, tire pressure notifications, general system notification, etc. In some embodiments, the instructions and/or directions may be directed to a customer 202 using both the ATM 209 and the electric vehicle charger 206. In some embodiments, the user interface display 238 is a touch screen display module.

In the embodiment illustrated in FIG. 2, the electric station server 208 further comprises a Wi-Fi provider 236 and a user interface display 238. The Wi-Fi provider 236 is implemented within the electric station server 208 to provide a Wi-Fi hotspot for the customer 202 of the electric station. The Wi-Fi hotspot may be a wireless local area network (LAN) protocol based on an 802.11 IEEE network standard. The Wi-Fi provider 236 allows the customer access to the Internet via a wireless network Wi-Fi system provided accessible through the electric station server 208. The Wi-Fi provider 236 may provide, through a direct connection to the electric vehicle, a customer 202 with access the internet within his vehicle. The Wi-Fi provider 236 may also provide the customer 202 with location based promotions, depending on Wi-Fi provider activation. The Wi-Fi provider 236 may also provide the customer 202 social network updates, such as indications of friends "liking" the electric station and/or the retail stores, restaurants, business, etc. in the area of the electric station. In some embodiments, the Wi-Fi provider 236 may provide a Wi-Fi network to the customer 202 free of charge of the Wi-Fi provider 236 may provide a Wi-Fi network to the customer 202 for a fee.

As illustrated in FIG. 2, both the Wi-Fi provider 236 and the user display interface 238 are operatively coupled to the communication device 224, the processing device 226, and the memory device 228 within the electric station server 208. In this way, the Wi-Fi provider 236 and the user display interface 238 may use the communication device 224 to communicate with the other devices on the network 201, such as, but not limited to the financial institution system 210 and the customer system 204.

Communicably linked to the electric station server 208 are an electric vehicle charger 206 and an ATM 209. In this way, the electric station server 208 may communicate with the electric vehicle charger 206 and the ATM 209 without use of the network 201. The electric vehicle charger 206 may provide electric charging to recharge battery banks in an electric vehicle, an outlet in hybrid vehicle, or any other battery charged machinery in need of charging. The electricity may be provided through a standard 120 volt outlet, a 208-240 volt outlet (220 volt nominal outlet), or a 440 volt outlet. The electric vehicle charger 206 may provided a direct connection cord to a vehicle. The vehicle may provide the direct connection cord to the electric vehicle charger 206. In this way, the electric vehicle application 207 may monitor battery voltage, current flow of electricity, overall temperature of the battery, and other vehicle diagnosis to ensure proper vehicle maintenance and charge. The electric vehicle application 207 may also monitor the amount of electricity the customer 202 uses. The electric vehicle application 207 may also provide an alert to the user when the electric vehicle charger 206 has completed its charge, the remaining amount of charge, and/or the percent of charge remaining. In this way, the electric vehicle application 207 may provide the electric station server 208 with the data, which is then either displayed on the electric station server 208 via the user interface display 238 or sent to the customer system 204 over the network 201 for customer viewing.

The direct connection from the vehicle to the electric vehicle charger 206 may also provide identification of the customer 202 and authentication of that identification, for use of the electric station. In this way, the connection between the vehicle and the electric vehicle charger 206 may provide vehicle specific identification or code to the electric station server 208, and in turn the electric station server 208 will provide the identification or code to the financial institution system 210 for further identification and authentication. This vehicle specific identification or code may be in the form of a VIN number or another type of vehicle specific identification that may be read via a direct connection from the vehicle to the electric vehicle charger 206. In some embodiments, the vehicle specific identification or code may also be associated with a customer account 202. The customer 202 account associated with the vehicle specific code may provide for payment for the customer 202 use of the electric station. In this way, the electric station application 234 communicates the account information to the financial institution system 210 for processing of the payment. This provides an advantage of allowing a customer 202 to pay for use of the electric station quickly without having to go through a transaction with the ATM 209.

An ATM 209 is also communicably linked to the electric station server 208. The ATM 209 may provide the customer 202 identification means for the electric station, ATM functionality, and payment means for use of the electric station. In this way, the ATM application 205 communicates with the electric station server 208 and provides the electric station server 208 data with respect to the ATM 209. Identification means may be provided by the customer 202 by a traditional ATM card and pin number activation process. The ATM card may be a contact or contactless card associated with the financial institution providing the ATM 209. The identification means may also be any recognizable medium wherein the ATM 209 and/or the financial institution associated with the ATM 209 may be able to positively identify the customer 202 as a customer 202 of the financial institution. These identification mechanisms may be, but are not limited to biometric identification, laser identification, magnetic strip readers, barcodes, radio frequency (RF), a character recognition device, a magnetic ink, code readers, near field communication, and/or the like. The identification means provide the identification of the customer 202, acquired by the ATM 209, to the electric station server 208, which in turn provides the identification to the financial institution system 210 for further authentication to allow the customer use of the electric station.

ATM functionality may be provided to the customer 202 through an interface provided by the user interface display 238, such as the interface described in FIG. 8. The ATM functionality, as explained in further detail below, may allow for access to customer accounts, allow for customer financial transactions, loading virtual currency, and allow for other ATM 209 functions such as providing stamps and the like. Customer accounts may include data associated with accounts of the financial institution of the ATM 209 such as access to account balances, account interest rates, etc. Customer financial transactions may include deposits, withdraws, transfer of funds, and cash advances. The ATM 209 may also provide payment means for customer 202 use of the electric station and ATM functionality so that the customer 202 may use any account associated with the financial institution or virtual currency linked to the ATM 209. The ATM functionality allows for payment means for fees incurred by the customer 202 at the electric station. The ATM functionality also provides the customer 202 the ability to pay cash for any fees incurred by the customer 202 at the electric station.

The ATM functionality may also provide the customer 202 the ability to pre-pay for use of the electric system. In this way, the customer 202 may pre-pay for the use of the electric station in order to hedge the future cost of electricity. The customer 202 may further be able to pre-pay for other individuals fees associated with the electric station, such as a family member or friend.

FIG. 2 also illustrates a customer system 204. The customer system 204 is operatively coupled to the financial institution server 210 and the electric station server 208 through the network 201. The customer system 204 has systems with devices the same or similar to the devices described for the financial institution server 210 and the electric station server 208 (i.e., communication device, processing device, and memory device). Therefore, the customer system 204 communicates with the financial institution system 210 and the electric station server 208 in the same or similar way as previously described with respect to each system. The customer system 204 is a computing system that may allow a customer 202 to use the electric station. In this way, a customer 202 may be able to be identified and the identification may be authenticated, such that the customer 202 may use the electric station. The customer system 204 may be, for example, a desktop personal computer, a mobile system, such as a cellular phone, smart phone, personal data assistant ("PDA"), laptop, near field communications, or the like.

A customer system 204 may also be a customer vehicle. The vehicle may be a customer system 204 that communicates with the electric station server 208 and/or the financial institution system 210 to allow the customer 202 to use the electric station. In some embodiments, communication from the vehicle customer system 204 to the electric station server 208 may be provided through a wire connection with the electric vehicle charger 206. In some embodiments, communication from the vehicle to the electric station server 208 may also be provided through the use of the network 201. Communication with the vehicle may also provide the customer 202 an indication of vehicle maintenance and performance. The customer 202 may receive this indication through the customer system 204 or through the user interface display 238 provided by the electric station server 208. The customer 202 may be notified when the vehicle has received adequate charging, has received any charging, or notification is provided for other vehicle system diagnostics. Other vehicle system diagnostics may include, but are not limited to battery notifications, generally vehicle maintenance, engine notifications, tire pressure notifications, general system notification, etc. Although only a single customer system 204 is depicted in FIG. 2, the electric station environment 200 may contain numerous customer systems 204.

FIG. 3 illustrates a process map illustrating identification and authentication means available to the electric station 300. In some embodiments, the ATM 302 provides means for establishing the identification of the customer 202. The identification may be provided by several mechanisms, including, but not limited to, biometric identification, laser identification, magnetic strip identification, barcode identification, radio frequency (RF), a character recognition device, a magnetic ink, code readers, near field communication, and/or the like. Utilizing one or more than one of these mechanisms the means for establishing identification, or identifiers, of a customer 202 may include contact identification 306, contactless identification 308, pin number identification 310, and mobile identification 312.

In block 306 contact identification identifiers are provided. Contact identification 306 may be identifiers that are provide by the customer 202 that are intended to directly contact the ATM 302. For example, a customer 202 may provide a card similar to a debit or credit card. The debit or credit card may be associated with a financial institution providing the ATM 302. The card may have a magnetic strip that contains data and can be read by the ATM application 205. The customer 202 may provide identification for himself by swiping the card at the ATM 302. The ATM application 205 may read the magnetic code and provide for identification of the customer 202. In another example, the customer 202 may have pre-established a biometric indicator with the financial institution of the ATM 302. The customer 202 may provide a figure print or other biometric indicator to the ATM 302. The ATM application 205 may read the biometrics and provide for identification of the customer 202.

In block 308 contactless identification identifiers are provided. Contactless identification 308 may be identifiers that are provided by the customer 202 that are intended to be in a near field to the ATM 302. For example, a customer 202 may provide a magnetic or other contactless card wherein the customer 202 may present the card in a close proximity to the contactless pad of the ATM 302. When the customer 202 provides such a card in a close enough proximity to activate a near field communication the ATM 302, by the ATM application 205, may communicate the card in the near field communication to provide for identification of the customer 202.

In block 310 pin number identification identifiers are provided. Pin number identification 310 may identify a customer 202 by a predetermined pin number associated with that specific customer 202 account at a financial institution. Pin number identification 310 may be provided by the customer 202 with a touch pad on the electric station, a touch screen on the electric station, or a keypad on the customer system 204. For example, a customer 202 may provide a pin number identification 310 on the touch pad of the ATM 302 to gain access to the electric station. The ATM 302, by the ATM application 205 may read the pin number identification 310 entered by the customer 202 and communicate the pin number to provide for identification of the customer 202.

In block 312 mobile identification identifiers are provided. Mobile identification 312 may identify a customer 202 by the customer system 204 or mobile system the customer 202 is using. In this way, the customer 202 may be able to drive to the electric station and a mobile identification 312 will automatically notify the electric station and the electric station server 208 that the customer 202 is near. The ATM 302, by the ATM application 205 may read the mobile identification 312 prior to the customer 202 arriving at the electric station and communicate the mobile identifier to provide for identification of the customer 202.

Once the identification means have been established the ATM application 205 communicates with the electric station application 234. The electric station application 234 receives the provided identification and authenticates the identification with the financial institution system 210. Once authentication of the identification of the customer 202 has been established, the customer 202 may use all functionality of the electric station.

In some embodiments, the electric vehicle charger 304 provides means for establishing the identification of the customer 202. The identification may be provided by several mechanisms, including, but not limited to, biometric identification, laser identification, magnetic strip identification, barcode identification, radio frequency (RF), a character recognition device, code readers, near field communication, and/or the like. Utilizing one or more than one of these mechanisms the means for establishing identification, or identifiers, of a customer 202 may include contact identification 318, contactless identification 320, pin number identification 314, and/or vehicle identification 316. Much in the same way the ATM application 205 provides for identification means, the electric vehicle application 207 may also provide these identification means. However, enabling the electric vehicle application 207 to provide identification means allows customers 202 not associated with the financial institution of the ATM 302 access to all functionality of the electric station. For example, if a customer 202 is not a customer 202 of the financial institution that provides the ATM 302, many of the identification means for the ATM 302 may not be accessible to the customer 202. Although a customer 202 may not be an account holder at the financial institution providing the ATM 302, the customer 202 may still wish to use the electric station. Therefore, the customer 202 is able to provide identification through the electric vehicle charger 304 as well as the ATM 302. Thus, the customer 202 may still have full access to all capabilities of the electric station, even the ATM functionality, without being an account holder at the financial institution providing the ATM 302.

In block 318 contact identification identifiers are provided. Much the same way as illustrated above with contact identifiers of the ATM 302, contact identification 318 of the electric vehicle charger 304 may similarly be identifiers that are provide by the customer 202 that are intended to directly contact the electric vehicle charger 304. For example, a customer 202 may provide a credit or debit card. The credit or debit card may not be associated with the financial institution of the ATM 302, thus it may not be recognized by the ATM 302. The credit or debit card may have a magnetic strip reader mechanism. The customer 202 may provide identification for himself by swiping the card at the electric vehicle charger 304. The electric vehicle charger 304, by the electric vehicle 207 may read the magnetic code identification 310 of the credit or debit card and communicate the code to provide for identification of the customer 202.

In block 320 contactless identification identifiers are provided. Much the same way as illustrated above with contactless identifiers of the ATM 302, contactless identification 320 of the electric vehicle charger 304 may be identifiers that are provided by the customer 202 that are intended to be in a near field to the electric vehicle charger 304. For example, a customer 202 may provide a magnetic or other contactless card wherein the customer 202 may present the card in a close proximity to the electric vehicle charger 304. The magnetic or other contactless card may not be associated with the financial institution of the ATM 302. The magnetic or other contactless card may be associated with the electric vehicle charger provide or electric company. When the customer 202 provides such a card in a close enough proximity to activate a near field communication the electric vehicle charger 304, by the electric vehicle application 207, may communicate the card in the near field communication to provide for identification of the customer 202.

In block 314 pin number identification identifiers are provided. Much the same way as illustrated above with pin number identifiers of the ATM 302, pin number identification 314 may identify a customer 202 by a predetermined pin number associated with a specific customer account at the electric vehicle charger or electric provider. For example, a customer 202 may have an identification account number associated with his electric bill. He may provide the identification account number at the electric vehicle charger 304 and the fee associated with using the electric station may be directed to the customer's electric bill. Pin number identification 310 may be provided by the customer 202 with a touch pad on the electric station, a touch screen on the electric station, or a keypad on the customer system 204. The electric vehicle charger 304, by the electric vehicle application 207 may read the pin number identification 314 entered by the customer 202 and communicate the pin number to provide for identification of the customer 202.

In block 316 vehicle identification identifiers are provided. Vehicle identification 316 may identify a customer 202 by a vehicle specific identification or code. The vehicle specific identification or code may be any type of code specific to that vehicle. For example, the code may be in the form of a VIN number or another type of vehicle specific identification that may be read via a direct connection from the vehicle to the electric vehicle charger 204. In another example, a vehicle specific identification or code may be one associated with a customer account at the electric provide. The electric provider may have a unique code, that when the vehicle is at the electric charging station the electric provider code is provided for identification. In some embodiments, the vehicle specific identification or code may be communicated to the electric vehicle application 207 thought the direct electric connection necessary to charge the electric vehicle. In some embodiments, the vehicle specific identification or code may be communicated to the electric vehicle application 207 through a network 201, from a customer system 204, and through the electric station server 208. Vehicle identification 316 may be provided by the customer vehicle to the electric vehicle charger 304. The electric vehicle charger 304, by the electric vehicle application 207 may read the vehicle identifier to provide for identification of the customer 202.

In some embodiments, multiple identifiers may be used by a customer 202. A pin number identification identify may be provided in association with another identify to provide security for the customer 202 to use the electric station. For example, a customer may provide a magnetic coded contact card in combination with a pin number identifier 310 to gain access to the electric station. In another example, the customer 202 may provide a pin number identification 310 along with mobile identification 312 to gain access to the electric station. A customer 202 may provide a pin number on a mobile smart phone or PDA in the network 201 of the electric station server 208 or in close proximity to the electric station.

In some embodiments, the ATM 302 provides means for authenticating the identification of the customer 202. In some embodiments, the electric vehicle charger 304 provides means for authenticating the identification of the customer 202. In some embodiments, both the ATM 302 and the electric vehicle charger 304 provide means for authenticating the identification of the customer 202. The combination of identifying and authentication a customer that are provided by the electric station may further serve as protection against misappropriation. For example, the various identification and authentication means could cross link with accounts and payment methods to ensure proper credentials of the customer 202. This cross linkage could further provide an indication to the customer 202 if there may be a problem with previously presented accounts.

Once the identification means have been established the electric vehicle application 207 communicates with the electric station application 234. The electric station application 234 receives the provided identification and authenticates the identification with the financial institution system 210. Once authentication of the identification of the customer 202 has been established, the customer 202 may use all functionality of the electric station.

FIGS. 4 through 7 illustrate several embodiments of the electric station 400, 500, 600, 700, in accordance with embodiments of the present invention. As will be appreciated by one of ordinary skill in the art, the present invention may be embodied in many forms. For example, the electric vehicle charger may be in combination with the ATM in many different forms. FIGS. 4 through 7 represent several forms of the combination; however they do not cover all forms of the present invention. As indicated, the invention may be embodied in many different forms and should not be construed as limited to the embodiments set forth herein.

FIG. 4 illustrates one such embodiment of the electric station 400. Location of the electric station 400 may be a critical factor. For example, the charging of an electric vehicle may take up to several hours to charge the vehicle fully. Even it the electric vehicle is semi-electric, meaning that the vehicle may run on a combination of electricity and some other power source, such as gasoline, it may take an hour or more to charge. Therefore, the electric station 400 may be provided at a shopping center, grocery center, mall, a parking lot, etc. Other venues may include a sporting arena, a convention center, etc. The strategic locations for the electric station 400 provides customers 202 with time to charge their vehicle while shopping or at an event, therefore not having to wait for the charge to complete. For example, if an electric station 400 is located in a parking lot, a customer 202 may park in that parking lot on a daily bases for work, thus the customer 202 may charge his vehicle any day he is at work. This location for an electric station 400 provides at least a few hours for a customer 202 to charge his vehicle.

The electric station may be powered in several ways. In some embodiment, the electric station may be powered by electricity. In this way, the ATM functionality and the electric vehicle charger functionality may both be provided to the customer using traditional electric power means. In some embodiments, the electric station may be powered by alternative power sources. Alternative power sources may include, but are not limited to, solar powering, wind powering, water powering, natural gas powering, battery powering, etc. In this way, the ATM functionality may be powered by alternative powering means. In some embodiments, the electric station may be powered by battery. In this way, the electric station may be able to charge an electric vehicle and/or provide ATM functionality to a customer 202 from an auxiliary battery power system. If the auxiliary battery power system runs low on charge, the auxiliary battery power system may be charged via an electric current provided from an electric provider or an alternative powering means, such as solar power. When demand for a charge via the auxiliary batter power system, the electricity stored within the auxiliary batter power system, from either an electric source and/or an alternative powering source, may be provided back to the electric provider for a fee.

In some embodiments, the electric station 400 may comprise features similar to features found on a standard ATM. For example, the lighting means 408 and the cash receptacle 406 may both provide similar functionality on the electric station 400, as they do on a standard ATM machine. The lighting means 408 located above the display 402 that may provide a customer 202 of the electric station 400 light for use of the electric station 400 at night. The lighting means 408 may also provide the customer 202 a safety mechanism to aid in the prevention of burglary or theft. The cash receptacle 406 may provide the customer 202 means for receiving cash that the customer 202 requests through the ATM functionality of the electric station 400.

In some embodiments, the electric station 400 further comprises a display 402, a contactless identification sensor 412, a contact identification sensor 414, a keypad 404, a receipt receptacle 410, a deposit receptacle 416, electric vehicle charger 417, and an electric charging outlet 418. In some embodiments, the contactless identification sensor 412 and/or the contact identification sensor 414 may provide the electric station 400 means of receiving identification from the customer 202. The customer 202 may provide contactless or contact identification means through the ATM functionality of the electric station or the electric vehicle charger functionality of the electric station. The identification means using the contactless or contact identifications may be provided through several mechanisms, including, but not limited to, biometric identification, laser identification, magnetic strip identification, barcode identification, radio frequency (RF), a character recognition device, a magnetic ink, code readers, near field communication, and/or the like.

In some embodiments, a contactless identifier may be provided by the customer 202 to the electric station. The contactless identifier may be directed to the ATM or to the electric vehicle charger, as described in further detail with respect to FIG. 3. The code from the contactless identifier may be read by the ATM application 205. The code from the contactless identifier may be read by the electric vehicle application 207. The code from the contactless identifier may be read by the electric station application 234. After the code has been read, the electric station application 234 may receive the code and provide authentication of the identification with the financial institution system 210

In some embodiments, a contact identifier may be provided by the customer 202 to the electric station. The contact identifier may be directed to the ATM or to the electric vehicle charger, as described in further detail with respect to FIG. 3. The code from the contact identifier may be read by the ATM application 205. The code from the contact identifier may be read by the electric vehicle application 207. The code from the contact identifier may be read by the electric station application 234. After the code has been read, the electric station application 234 may receive the code and provide authentication of the identification with the financial institution system 210.

In some embodiments, the keypad 404 may provide for identification of the customer 202 for use of the electric station 400. The keypad 404 may provide the customer 202 means for inputting a pin number identification, as described in further detail with respect to FIG. 3. In this way, the keypad 404 enables the customer 202 to input his pin number into the electric station 400, so that the electric station 400 may be able to read and identify the pin number provided by the customer 202. In some embodiments, the pin number inputted on the keypad 404 may be read by the ATM application 205. The pin number inputted on the keypad 404 may be read by the electric vehicle application 207. The pin number inputted on the keypad 404 may be read by the electric station application 234. After the pin number has been read, the electric station application 234 may receive the pin number and provide authentication of the identification with the financial institution system 210.

In some embodiments, a customer 202 vehicle connected to the electric vehicle charger 417. In FIG. 4, the electric vehicle charger 417 comprises an electric charging outlet 418. The electric vehicle charger 417 may provide identification of the customer 202 to the electric station. The vehicle connection may be directed to the electric vehicle charger, as described in further detail with respect to FIG. 3. The electric vehicle charger 417 may provide means for reading a vehicle specific identifier, such as, but not limited to a vehicle VIN number, an account associated with the vehicle, a code from the customer system 204, near field communication, other identification of the electric vehicle, etc. so that the electric station 400 may be able to read the code provided by the customer vehicle. The code from the customer vehicle may be read by the electric vehicle application 207. The code from the customer vehicle may be read by the electric station application 234. After the code has been read, the electric station application 234 may receive the code and provide authentication of the identification with the financial institution system 210.

In some embodiments, customer 202 selection of the electric vehicle charger 417 is provided by a start-up interface 800, viewable on a display 402. The display 402 provides a means for displaying information related to the customer's 202 use of the electric station 400. Display information may be, but is not limited to display of interfaces, such as the start-up interface 800 and the charging interface 900. Along with displaying these interfaces, the display 402 may provide data, instructions, and/or directions to the customer 202, from the user interface display 238, regarding use the electric station 400. In some embodiments, the display 402 is a touch screen display module.

FIG. 8 illustrates a start-up interface 800, in accordance with embodiments of the present invention. After identification and authentication of identification, the customer 202 is presented with the start-up interface 800, on the display 402. The start-up interface 800 provides the customer 202 the means to access the ATM functionality in section 802, the means to access the electric vehicle functionality in section 804, the means to activate the Wi-Fi hot-spot in section 806, and the means to receive location based promotions in section 808.

In some embodiments, the customer may select the ATM functionality of the electric station. In section 802 of the start-up interface 800, the customer 202 is able to select from the ATM functionality of the electric station. The ATM functionally is similar to standard ATM functionality; in that the customer 202 may view financial institution account information, deposit checks or cash into financial institution accounts, withdraw funds from a financial institution account, and other ATM functions such as purchasing stamps. In section 802 of the start-up interface 800, the customer 202 may select accounts 810 that are accessible via the ATM functionality. The accounts may be accounts associated with the financial institution providing the ATM and/or accounts associated with other financial institutions. The customer 202 may also select to receive fast cash 812. Fast cash 812 provides the customer 202 with cash from any account accessible by the ATM. However, fast cash 812 provides the customer 202 with his most recent cash selections. For example, the customer 202 may have selected to receive one hundred dollars in cash from a checking account the last time the customer 202 was at an ATM. The ATM functionality of the electric station will recall the customer's 202 previous transaction and provide a quick link to receive one hundred dollars cash from the same checking account. In section 814 the customer 202 may deposit funds into an account. The customer 202 may select the deposit section 814 and provide the funds into the deposit receptacle 416. The funds deposited in the deposit receptacle 416 may be cash or checks. In section 816 of the start-up interface 800, the customer 202 may withdraw funds from an account. The customer 202 may select the withdraw section 816 and receive funds from an account associated with the ATM. In section 818 the customer 202 may view account balances. The accounts that are viewable may include all accounts associated with the financial institution of the ATM, accounts at other financial institutions, or accounts provided at other business entities.

In some embodiments, the customer 202 may select the Wi-Fi functionality of the electric station. In section 806 of the start-up interface 800, the customer 202 may select to activate the Wi-Fi functionality of the electric station by selecting the activate button 822. The Wi-Fi functionality is implemented within the electric station server 208 to provide a Wi-Fi hot-spot for the customer 202 of the electric station.

In some embodiments, the customer may select to see the location based promotions. In section 808 of the start-up interface 800, the customer 202 may select to receive location based promotions from the electric station by selecting the select promotions button 824. In some embodiments, the Wi-Fi provider 236 may provide the customer 202 with location based promotions 808. In some embodiments, the Wi-Fi provider 236 may also provide the customer 202 social network updates, such as indications of friends "liking" the electric station and/or the retail stores, restaurants, business, etc. in the area of the electric station. In some embodiments, the Wi-Fi provider 236 may provide a direct connection to the electric vehicle to enable a customer 202 to access the internet within his vehicle. In some embodiments, the electric station server 208, with access to a network 201, may also provide the customer 202 with location based promotions 808. Location based promotions 808 track global positioning systems ("GPS") to pinpoint the location of the electric station. The financial institution along with other business entities may provide customers 202 specific promotions at the electric station. These location based promotions 808 are such that they provide discounts, rebates, and/or coupons to closely situated business. For example, if the electric station is located near a large shopping district, the location based promotions 808 may be directed to stores in that specific shopping district. For another example, if the electric station is located near a parking lot close to a customer's 202 place of business, the location based promotions 808 may be directed to local restaurants. The location based promotions 808 may be provided to every customer 202 of the electric station or to specific customers 202 of the electric station, depending on various factors. These factors may include amount of use of an electric station, use of the financial institution, or use of the business providing the promotions. Once a customer 202 has selected promotions he wishes to receive the electric station may provide the selected promotion to the customer. A printed version of the selected promotion may be provided through the receipt receptacle 410 of the electric station. An electronic version of the selected promotion may be provided to the customer system 204.

In section 804 of the start-up interface 800, the customer 202 is able to select from the electric vehicle charger functionality of the electric station. By selecting charge vehicle 820, the customer 202 is directed to the charging interface 900.

FIG. 9 illustrates an embodiment of the charging interface 900 in accordance with embodiments of the present invention. The customer 202 may select several charging options 902. Charging options 902 allow the customer 202 to charge the vehicle at various voltages and for various ranges, depending on vehicle manufacturer specifications. In section 912 of the charging interface 900, the customer may select the voltage at which he wishes to charge. The electric vehicle chargers may be classified as level 1, level 2, or level 3 depending on the location, voltage produced, and manufacturer. The electric vehicle charger may provide electric charging to recharge battery banks in an electric vehicle, an outlet in hybrid vehicle, or any other battery charged machinery in need of charging. The electric vehicle charger may be able to charge a wide range of batteries, including but not limited to a standard 15,000 watt battery. The electric charge may be provided through a standard 120 volt outlet, a 208-240 volt outlet (220 volt nominal outlet), or a 440 volt outlet. In some embodiments, the electric vehicle charger may plug into the vehicle to provide a charge to an electric vehicle. In some embodiments, the electric vehicle charger may provide an outlet for the vehicle to plug into to provide a charge to an electric vehicle. In some embodiments, the electric vehicle charger may provide a contact point, such as a contact mat, for the electric vehicle to drive onto to provide a contact charge to the vehicle. In some embodiments, the electric vehicle charger may provide a contactless charge to the vehicle to provide a charge, such as an electric field that may provide a charge to the vehicle.

The electric station may provide for several different voltage charges to the customer 202. Therefore, the customer 202 may have to select the voltage he requires for his charge, by the select voltage button 912. The voltage selected by the customer 202 may be the required voltage for the battery, it may be selected to provide a faster charge, or it may be selected to be the most cost effective charge. If the customer 202 has no preference on the voltage at which the battery charges, the electric station server 208 through the processing device 226 may determine the correct voltage for the customer's application. The correct voltage may take into consideration the batteries, the time allowed for a charge, the cost of the charge, the type of connection for the vehicle, etc. For example, the customer 202 may select to have a timed charge 914. If the customer 202 selects only to have a twenty minute charge and the customer 202 vehicle batteries have no limitation on charging voltage, the electric station server 208 may select the maximum voltage to ensure a substantial batter charge.

Once the voltage of the charge is selected, the customer 202 may select a charging range 904. A charging range 904 may include a time charge 914, a full charge 916, a level charge 918, or a cost charge 920. In section 914 of the charging interface 900, a time charge may be selected by the customer 202. A time charge will charge the customer's 202 vehicle for a specific time period that the customer 202 selects. For example, the customer 202 may only be parked at the electric station for one hour. Therefore, the customer 202 may select to charge his vehicle for the one hour that he will be at the electric station. In section 916 a full charge may be selected by the customer 202. A full charge will allow the electric vehicle charger to charge the customer's 202 vehicle until the batteries are charged to full. This ensures that the customer 202 may be able to drive a maximum distance on the charge. For example, the customer 202 may be on a longer trip. The trip may require several charges to complete. Therefore, the customer 202 may wish to ensure a full charge prior to continuing on his trip. In section 918 of the charging interface 900, a level charge may be selected by the customer 202. A level charge allows the customer 202 to select a specific level to which to charge the batteries. For example, the customer 202 may wish to charge his vehicle to 85% capacity. The customer 202 may select a level charge. The level charge will indicate to the electric vehicle charger to only charge the customer's 202 vehicle to 85% capacity. In section 920 of the charging interface 900, a cost charge may be selected by the customer 202. A cost charge allows the customer 202 to charge his vehicle to a specific payment amount. For example, the customer 202 may only wish to pay twenty dollars to charge his electric vehicle. The electric vehicle charger will recognize the selection to charge to a specific cost and terminate charging once the charge has reached twenty dollars.

In order to charge the customer 202 vehicle the electric vehicle charger 417 must provide a charging connector. FIGS. 4 and 5 illustrate an electric station 400, 500 that includes an electric charging outlet 418, 518. In some embodiments the vehicle provides a cord to outlet into the electric charging outlet 418, 518 of the electric vehicle charger 417, 519. In other embodiments, such as the embodiments illustrated in FIGS. 6 and 7, disclose the electric station 600, 700 provides the charging cord 622, 722 adapted to the electric vehicle charger 619, 719. The end of the charging cord 622, 722 is adapted to receive an outlet located at the vehicle, the vehicle adaptor 626, 726. In some embodiments, the vehicle may provide for identification through the electric vehicle charger 417. The identification may be provided from the vehicle through the connection made with the electric vehicle charger 417.

Once the customer 202 has used either the ATM functionality and/or the electric vehicle charger functionality of the electric station, the customer 202 may have to provide payment of fees accumulated during that use. FIG. 9 illustrates a charging interface 900. The payment options 906 may be used for fees accumulated during use of the ATM functionality of the electric station, for fees accumulated during use of the electric vehicle charger of the electric station, and/or for fees accumulated during use other functionality of the electric station. The payment options 906 may also be used for fees accumulated during use of a combination of the functionalities of the electric station. The payment options 906 that may be selected by a customer 202 include payment using a credit or debit card 922, payment using cash 924, payment using an ATM account 926, or payment using a vehicle account 928.

In section 922 of the charging interface 900, a credit or debit card may be selected by the customer 202 as a payment option 906. In the credit or debit card may be provided from the financial institution associated with the ATM of the electric station. The credit or debit card may also be provided from a financial institution or other business entity not associated with the ATM of the electric station. In section 924 of the charging interface 900, cash may be used by the customer 202 as a payment option 906. Cash may be provided by the customer 202 through the deposit receptacle 416 located on the electric station. In section 926 of the charging interface 900 an ATM account may be used by the customer 202 as a payment option 906. An ATM account may be provided as a payment option through the ATM functionality of the electric station. A customer 202 may select from the accounts the customer 202 has with the financial institution of the ATM to direct a payment for the use of the electric station from that specific account. For example, a customer 202 may have a savings account associated with the financial institution providing the ATM functionality to the electric station. The customer 202 may select to use that savings account for payment of fees for use of the electric station. In section 928 of the charging interface 900, a vehicle account may be used by the customer 202 as a payment option 906. The account associated with the customer 202 vehicle may be vehicle specific identification or code, such as a VIN number, and may also be associated with a customer vehicle account. In this way, the customer 202 may provide payment for any fees incurred at the electric station through use of the customer vehicle account associated with the vehicle. The customer vehicle account may be provided by a financial institution, by the customer's electric provider, and/or by another business entity. The vehicle account may be determined by connection of the vehicle to the electric station or by near field communications. In this way, the connection is either established by either an electric charging outlet 418 or a vehicle adaptor 626.

These payment options 906 may be provided to the electric station by several means, including, but not limited to, through the contactless identification sensor 412, the contact identification sensor 414, the deposit receptacle 416, and/or the electric vehicle charger 417.

In some embodiments, the contactless identification sensor 412 and/or the contact identification sensor 414 may provide the customer 202 a payment means for payment of fees for using the electric station. The payment options using the contactless or contact identifications may include, but are not limited to, credit cards, debit cards, ATM accounts, and vehicle accounts. The contactless identification sensor 412 may provide for payment means for fees accumulated by the customer 202 for use of the electric station. Once a customer 202 has completed his use of the electric station the fees he accumulates may be paid via a contactless means. For example, the customer 202 accumulates fees from charging his electric vehicle and also using location based promotions. If the customer 202 so chooses, he may select to pay for the use of the electric station with a contactless credit card. The contactless credit card may be positioned such that the near field communication system of the contactless identification sensor 412. The contactless identification sensor 412 may read the code from the contactless credit card via the electric station application 234 and direct payment through the electric station application 234 to the financial institution system 210 for further processing. In this way, the electric station server 208 communicates the account information to the financial institution station application 222 and the financial institution station application 222 communicates with the processing device 214 to process the transaction to the request account.

In another embodiment, the contact identification sensor 414 may provide for payment means for fees accumulated by the customer 202 for use of the electric station. Once a customer 202 has completed his use of the electric station the fees he accumulates may be paid via a contact means. For example, the customer 202 accumulates fees from using the ATM functionality and also using location based promotions. If the customer 202 so chooses, he may select to pay for the use of the electric station with a credit card. For example, the customer 202 may use a credit card with magnetic strip code at the electric station. The magnetic strip of the credit card may come in contact with the contact identification sensor 414 of the electric station. The contact identification sensor 414 may read the code from the credit card via the electric station application 234 and direct payment through the electric station application 234 to the financial institution system 210 for further processing. In this way, the electric station server 208 communicates the account information to the financial institution station application 222 and the financial institution station application 222 communicates with the processing device 214 to process the transaction to the request account.

In some embodiments, the deposit receptacle 416 may provide the customer 202 a payment means for payment of fees for using the electric station. The payment options using the deposit receptacle 416 may include, but are not limited to using the cash payment option. Once a customer 202 has completed his use of the electric station the fees he accumulates may be paid via the deposit receptacle 416. For example, the customer 202 accumulates fees from charging his electric vehicle and also purchasing stamps through the ATM. If the customer 202 so chooses, he may select to pay for the use of the electric station with a cash. The cash payment may be placed in the deposit receptacle 416 such that the deposit receptacle 416 of the electric station 400 may receive the cash. The deposit receptacle 416 may then determine the amount of cash provided from the customer 202. The change may be applied to an account associated with the ATM. The change may be dispensed from the cash receptacle 406. The electric station application 234 may read the cash amount from the deposit receptacle 416 and direct payment through the electric station application 234 to the financial institution system 210 for further processing. In this way, the electric station server 208 communicates the payment information to the financial institution station application 222 and the financial institution station application 222 communicates with the processing device 214 to process the transaction further.

In yet another embodiment, the electric vehicle charger 417 through connection to a customer vehicle by either an electric charging outlet 418 or a vehicle adaptor 626 may provide the customer 202 a payment means for payment of fees for using the electric station. The payment options using the electric vehicle charger 417 may include, but are not limited to, ATM accounts and vehicle accounts. Once a customer 202 has completed his use of the electric station the fees he accumulates may be paid via a vehicle account. In some embodiments, the vehicle account may require a connection from the vehicle to the electric vehicle charger 417 to be used. The vehicle account may require a wireless connection between a customer system 204 and the electric station server 208 to be used. The vehicle account does not necessarily only have to be used for electric vehicle charging functionality of the electric station, but the vehicle account may be used for payment of any fees acquired during use of the electric station. For example, the customer 202 accumulates fees from charging his electric vehicle and also using location based promotions. If the customer 202 so chooses, he may select to pay for the use of the electric station with an account associated with his vehicle. In some embodiments the account associated with the customer's 202 vehicle may be provided by a financial institution. In some embodiments the account associated with the customer's vehicle may be provided by the customer's electric provider. In some embodiments the account associated with the customer's vehicle may be provided by another business entity. The electric vehicle application 207 reads the code associated with the customer vehicle account and provides the account information associated with that code to the electric station application 234. The electric station application 234 may, in turn, provide the account information to the financial institution system 210 for further processing. In this way, the electric station server 208 communicates the account information to the financial institution station application 222 and the financial institution station application 222 communicates with the processing device 214 to process the transaction to the request account.

Similar to the start-up interface 800, the charging interface 900 may also include a section for Wi-Fi 908, with a button to activate the Wi-Fi hot-spot 930 and a section for location based promotions 910, with a button to select the location based promotions 932. The Wi-Fi section 908 and the location based promotions section 910 provide for similar features as described above with respect to the Wi-Fi section 806 and the location based promotions section 808 of the start-up interface 800.

Once the customer 202 has completed using the charging interface 900, the customer 202 may select the finish button 934. The finish button 934 will direct the customer 202 back to the start-up interface 800. If the customer 202 has finished using the electric station and has identified payment means for all fees that may have accumulated during use of the electric station, the customer 202 may select the finish button 826 on the start-up interface 800 to log-out of the electric station. At this point, the electric station application 234 may provide a receipt detailing the customer's use of the electric station. The receipt may detail any financial transactions made through use of the ATM. The receipt may detail any use of the electric vehicle charger. Use of the electric vehicle charger may include charging of a vehicle, other vehicle diagnostics, and payment through vehicle accounts. The receipt is provided to the customer 202 via the receipt receptacle 410 located on the electric station 400.

FIGS. 5 through 7 represent alternative embodiments of the electric station. FIG. 5 illustrates an embodiment of the electric station 500, in accordance with the present invention. Like the electric station illustrated in FIG. 4, the electric station 500 includes features such as a lighting means 508, a display 502, a contactless identification sensor 512, a contact identification sensor 514, a keypad 504, a cash receptacle 506, a receipt receptacle 510, a deposit receptacle 516, an electric vehicle charger 519, and an electric charging outlet 518.

In the embodiment illustrated in FIG. 5, the electric station 500 provides for an alternative contact identification sensor 520. The alternative contact identification sensor 520 provides for similar functionality as the contact identification sensor 514. The alternative contact identification sensor 520 provides the customer 202 a quicker means to charge his electric vehicle. For example, if the customer 202 only wishes to charge his vehicle and would like to pay with a contact payment means, the customer 202 may simply use the alternative contact identification sensor 514 for payment means. In this way the customer 202 may not need to provide further identification, etc. necessary to use all the functionality of the electric station 500.

The electric station 500 also illustrates an alternative placement for the electric vehicle charger 519. In the electric station illustrated in FIG. 4, the electric vehicle charger 417 is placed in the lower stand portion of the electric station 400. In the electric station 500 illustrated in FIG. 5 the electric vehicle charger 519 is positioned closer to waist level. This embodiment may provide for ease of use for some customers 202 of the electric station, thus preventing unnecessary bending over for the customer 202.

FIG. 6 illustrates an embodiment of the electric station 600, in accordance with the present invention. Like the electric station illustrated in FIG. 4, the electric station 600 includes features such as a lighting means 608, a display 602, a contactless identification sensor 612, a contact identification sensor 614, a keypad 604, a cash receptacle 606, a receipt receptacle 610, a deposit receptacle 616, an electric vehicle charger 619, and an electric charging outlet 618. Like the electric station illustrated in FIG. 5, the electric station 600 also includes an alternative contact identification sensor 620 and the positioning of the electric vehicle charger 619 is in the same location with respect to the electric station 600.

The electric station 600 provides for an alternative means of charging a vehicle. While the electric station illustrated in FIGS. 4 and 5 provided an electric charging outlet 418, 518, the electric station 600 provides a cord 622 adapted to the electric charging outlet 618. In this embodiment, the customer 202 may not have to provide his own cord for charging his electric vehicle. The cord 622 provides adaptation to the electric charging outlet 618 on one end and a vehicle adaptor 626 on the other end. The vehicle adaptor 626 provides an adaptor that may be implemented to connect to an outlet on the vehicle. The electric vehicle station 600 provides for storage of the cord 622 when it is not in use, in the storage housing 624.

FIG. 7 illustrates an embodiment of the electric station 700, in accordance with the present invention. Like the electric station illustrated in FIG. 6, the electric station 700 includes features such as a lighting means 708, a display 702, a contactless identification sensor 712, a contact identification sensor 714, a keypad 704, a cash receptacle 706, a receipt receptacle 710, a deposit receptacle 716, an electric vehicle charger 719, and an electric charging outlet 718, an alternative contact identification sensor 720, a cord 622, a vehicle adaptor 626, and a storage housing 624.

The electric station 700 illustrated in FIG. 7 provides for an alternative placement for the electric vehicle charger 719. In the electric station illustrated in FIG. 6, the electric vehicle charger 619 is placed in the lower stand portion of the electric station 600. In the electric station 700 illustrated in FIG. 7 the electric vehicle charger 719 is positioned closer to waist level. This embodiment may provide for ease of use for some customers 202 of the electric station, thus preventing unnecessary bending over for the customer 202.

As will be appreciated by one of ordinary skill in the art, the present invention may be embodied as an apparatus (including, for example, a system, a machine, a device, a computer program product, and/or the like), as a method, or as any combination of the foregoing. Accordingly, embodiments of the present invention may take the form an embodiment combining software and hardware aspects that may generally be referred to herein as a "system." As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems and/or methods. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing an electric station for use by a customer, the electric station configured to charge a vehicle, the method comprising:
   providing an electric vehicle charger;
   providing an automated teller machine;
   coupling the automated teller machine and the electric vehicle charger in the electric station, such that the automated teller machine and the electric vehicle charger are communicably linked;
   receiving a request to use the electric station from the customer;
   matching, using a processing device, the customer for use of the electric station by identifying a vehicle owned by the customer at the electric vehicle charger and an authentication of the customer at the automated teller machine, such that a match between the customer at the automated teller machine and the identification of an owner of the vehicle at the electric vehicle charger being the customer is required;

providing the customer with one or more promotional offers for merchants near the electric station, wherein the promotional offers are based at least in part on the proximity of the merchant to the electric station; and providing automated teller machine functionality, electric vehicle charging functionality, and promotional offers for merchants near the electric station to the customer, wherein the provided automated teller machine, the electric vehicle charging functionality, and the promotional offers for merchants near the electric station are based on the matching.

2. The method of claim 1, further comprising facilitating a payment for use of the electric station, based at least in part on the automated teller machine functionality.

3. The method of claim 1 wherein coupling the automated teller machine and the electric vehicle charger comprises creating a physical coupling between the automated teller machine and the electric vehicle charger.

4. The method of claim 1 wherein coupling the automated teller machine and the electric vehicle charger comprises establishing an electronic communication channel between the automated teller machine and the electric vehicle charger.

5. The method of claim 1 wherein the identifier is provided to the electric station via a contact terminal.

6. The method of claim 1 wherein the identifier is provided to the electric station via a signal from a contactless terminal.

7. The method of claim 1 wherein the identifier is provided to the electric station through a connection between an electric vehicle charger and a vehicle, wherein the identifier is provided by the vehicle.

8. The method of claim 1 wherein providing the automated teller machine functionality comprises providing access to one or more financial accounts to the customer.

9. The method of claim 1 wherein allowing access to the electric vehicle charger comprises providing an outlet adapted to charge the vehicle.

10. The method of claim 1 wherein allowing access to the electric vehicle charger comprises a cable adapted to be removably attached to the electric vehicle and is configured to charge the vehicle.

11. A system for providing an electric station for use by a customer, configured to charge a vehicle, the system comprising:
an automated teller machine and an electric vehicle charger with a processing device configured to execute computer-readable program code to:
couple the automated teller machine and the electric vehicle charger in the electric station, such that the automated teller machine and the electric vehicle charger are communicably linked;
receive a request to use the electric station from the customer;
match the customer for use of the electric station by identifying a vehicle owned by the customer at the electric vehicle charger and an authentication of the customer at the automated teller machine, such that a match between the customer at the automated teller machine and the identification of an owner of the vehicle at the electric vehicle charger being the customer is required;
create a wireless internet access area for the customer based on the authentication, wherein the wireless internet access area can be accessed by the customer using one or more devices;
provide the customer with one or more promotional offers for merchants near the electric station, wherein the promotional offers are based at least in part on the proximity of the merchant to the electric station; and
provide automated teller machine functionality, electric vehicle charging functionality, and promotional offers for merchants near the electric station to the customer, wherein the provided automated teller machine, the electric vehicle charging functionality, and the promotional offers for merchants near the electric station are based on the matching.

12. The system of claim 11, wherein the processing device is configured to facilitate a payment for use of the electric station, based at least in part on the automated teller machine functionality.

13. The system of claim 11 wherein coupling the automated teller machine and the electric vehicle charger comprises creating a physical coupling between the automated teller machine and the electric vehicle charger.

14. The system of claim 11 wherein coupling the automated teller machine and the electric vehicle charger by establishing an electronic communication channel between the automated teller machine and the electric vehicle charger.

15. The system of claim 11 wherein the identifier is provided to the electric station via a contact terminal.

16. The system of claim 11 wherein the identifier is provided to the electric station via a signal from a contactless terminal.

17. The system of claim 11 wherein the identifier is provided to the electric station through a connection between an electric vehicle charger and a vehicle, wherein the identifier is provided by the vehicle.

18. The system of claim 11 wherein processing device is further configured to provide the automated teller machine functionality, wherein the automated teller machine functionality comprises providing access to one or more financial accounts to the customer.

19. The system of claim 11 wherein allowing access to the electric vehicle charger comprises providing an outlet adapted to charge the vehicle.

20. The system of claim 11 wherein allowing access to the electric vehicle charger comprises a cable adapted to be removably attached to the electric vehicle and is configured to charge the vehicle.

21. A method for providing an electric station for charging a vehicle, the method comprising:
providing a communication link with an account provider;
providing an electric vehicle charger, configured to charge a vehicle;
providing an automated teller machine;
coupling the communication link and the electric vehicle charger in the electric station, such that the automated teller machine and the electric vehicle charger are communicably linked;
receiving a request to use the electric station from an account holder;
matching, using a processing device, the account holder for use of the electric station by identifying a vehicle owned by the account holder at the electric vehicle charger and an authentication of the account holder at the automated teller machine, such that a match between the account holder at the automated teller machine and the identification of an owner of the vehicle at the electric vehicle charger being the account holder is required;
creating a wireless internet access;
creating a wireless internet access area for the account holder based on the authentication, wherein the wireless internet access area can be accessed by the account holder using one or more devices;

providing the account holder with one or more promotional offers for merchants near the electric station, wherein the promotional offers are based at least in part on the proximity of the merchant to the electric station; and providing automated teller machine functionality and electric vehicle charging functionality, and promotional offers for merchants near the electric station to the account holder, wherein the provided automated teller machine, the electric vehicle charging functionality, and the promotional offers for merchants near the electric station are based on the matching.

22. The method of claim 21, further comprising facilitating a payment for use of the electric station, based at least in part on the automated teller machine functionality.

23. The method of claim 21 wherein coupling the communication link and the electric vehicle charger comprises creating a physical coupling between the communication link and the electric vehicle charger.

24. The method of claim 21 wherein coupling the communication link and the electric vehicle charger comprises establishing an electronic communication channel between the communication link and the electric vehicle charger.

25. The method of claim 21 wherein the identifier is provided to the electric station via a contact terminal.

26. The method of claim 21 wherein the identifier is provided to the electric station via a signal from a contactless terminal.

27. The method of claim 21 wherein authenticating identification of the account holder is based at least in part an identifier provided by the account holder, wherein the identifier is further enabled to allow access to the electric vehicle charger.

28. The method of claim 27 wherein the identifier is provided to the electric vehicle charger through a connection between the electric vehicle charger and the vehicle, wherein the identifier is provided by the vehicle.

29. The method of claim 21 wherein providing the automated teller machine functionality comprises providing access to one or more financial accounts of the account holder.

30. The method of claim 21 wherein the electric vehicle charger comprises providing an outlet adapted to charge the vehicle.

31. The method of claim 21 wherein the electric vehicle charger comprises a cable adapted to be removably attached to the vehicle and is configured to charge the vehicle.

32. A system for providing an electric station for charging a vehicle, the system comprising:
 a communication link with an account provider;
 an electric vehicle charger, configured to charge a vehicle; and
 a processing device configured to:
  couple the communication link and the electric vehicle charger, such that the communication link and the electric vehicle charger cooperate to identify and authorized use of the electric station;
  receive a request to use the electric station from an account holder;
  match the account holder for use of the electric station by identifying a vehicle owned by the account holder at the electric vehicle charger and an authentication of the account holder at the automated teller machine, such that a match between the account holder at the automated teller machine and the identification of an owner of the vehicle at the electric vehicle charger being the account holder is required;
  creating a wireless internet access;
  create a wireless internet access area for the account holder based on the authentication, wherein the wireless internet access area can be accessed by the account holder using one or more devices;
  provide the account holder with one or more promotional offers for merchants near the electric station, wherein the promotional offers are based at least in part on the proximity of the merchant to the electric station; and
  provide automated teller machine functionality and electric vehicle charging functionality, and promotional offers for merchants near the electric station to the account holder, wherein the provided automated teller machine, the electric vehicle charging functionality, and the promotional offers for merchants near the electric station are based on the matching.

33. The system of claim 32 wherein the processing device is further configured to facilitate a payment for use of the electric station, based at least in part on the automated teller machine functionality.

34. The system of claim 32 wherein the processing device is further configured to couple the communication link and the electric vehicle charger comprises creating a physical coupling between the communication link and the electric vehicle charger.

35. The system of claim 32 wherein the processing device is further configured to couple the communication link and the electric vehicle charger comprises establishing an electronic communication channel between the communication link and the electric vehicle charger.

36. The system of claim 32 wherein the identifier is provided to the electric station via a contact terminal.

37. The system of claim 32 wherein the identifier is provided to the electric station via a signal from a contactless terminal.

38. The system of claim 32 wherein the identifier is provided to the electric vehicle charger through a connection between the electric vehicle charger and the vehicle, wherein the identifier is provided by the vehicle.

39. The system of claim 32 wherein the processing device is further configured to provide the automated teller machine functionality comprises providing access to one or more financial accounts of the account holder.

40. The system of claim 32 wherein the electric vehicle charger comprises providing an outlet adapted to charge the vehicle.

41. The system of claim 32 wherein the electric vehicle charger comprises a cable adapted to be removably attached to the vehicle and is configured to charge the vehicle.

* * * * *